US007765128B2

(12) United States Patent
Brooks et al.

(10) Patent No.: US 7,765,128 B2
(45) Date of Patent: Jul. 27, 2010

(54) PROGRAMMABLE TICKETING SYSTEM

(75) Inventors: Tyler Brooks, Seattle, WA (US); Kevin McLaughlin, Charlestown, MA (US); Helga Cecilia Dahl, Boston, MA (US); Edward Kim, Seattle, WA (US)

(73) Assignee: Smart Destinations Inc., Boston, MA (US)

( * ) Notice: Subject to any disclaimer, the term of this patent is extended or adjusted under 35 U.S.C. 154(b) by 704 days.

(21) Appl. No.: 10/896,287

(22) Filed: Jul. 21, 2004

(65) Prior Publication Data

US 2006/0020517 A1 Jan. 26, 2006

(51) Int. Cl.
*G06Q 30/00* (2006.01)

(52) U.S. Cl. .......... 705/26

(58) Field of Classification Search .......... 705/26, 705/27

See application file for complete search history.

(56) References Cited

U.S. PATENT DOCUMENTS 5,309,355 A 5/1994 Lockwood
5,566,327 A 10/1996 Sehr
5,948,040 A * 9/1999 DeLorme et al. .......... 705/5
5,987,430 A 11/1999 Van Horne et al.
6,078,928 A 6/2000 Schnase et al.
6,085,976 A 7/2000 Sehr
6,173,209 B1 * 1/2001 Laval et al. .......... 700/91
6,233,604 B1 5/2001 Van Horne et al.
6,283,376 B1 9/2001 Schuder et al.
6,363,351 B1 3/2002 Moro
6,386,451 B1 5/2002 Sehr
6,565,000 B2 5/2003 Sehr
6,601,233 B1 7/2003 Underwood
6,609,655 B1 8/2003 Harrell
6,657,543 B1 12/2003 Chung
6,776,332 B2 8/2004 Allen et al.
6,813,608 B1 * 11/2004 Baranowski .......... 705/6

(Continued)

FOREIGN PATENT DOCUMENTS

EP 0 924 634 A2 6/1999

(Continued)

OTHER PUBLICATIONS

The New York Pass—Making the most of your trip to New York, 1 page printed from http://web.archive.org/web/20020720081557/http://www.newyorkpass.com/.*

(Continued)

*Primary Examiner*—Jason Dunham
(74) *Attorney, Agent, or Firm*—Foley & Lardner LLP

(57) ABSTRACT

A smart-card based system and methods to control access to a plurality of attractions within a geographical area. The system may include one or more reward terminals that are located at attractions and are configured to read smart cards presented to them and, assuming the card is valid for that location, allow the card holder to access the attraction. Each smart card may be programmed with a product code that defines the attractions at which the card may be used. Product codes may be stored in a central database along with a list of the attractions associated with the each product code. The list of attractions may be updated as desired, thereby updating and changing the attractions at which any given card may be used.

24 Claims, 9 Drawing Sheets

U.S. PATENT DOCUMENTS

| | | | | |
|---|---|---|---|---|
| 6,889,098 | B1 * | 5/2005 | Laval et al. | 700/19 |
| 2001/0018660 | A1 | 8/2001 | Sehr | |
| 2001/0041994 | A1 | 11/2001 | Kim | |
| 2002/0026348 | A1 | 2/2002 | Fowler et al. | |
| 2002/0046116 | A1 | 4/2002 | Hohle et al. | |
| 2002/0062253 | A1 | 5/2002 | Dosh et al. | |
| 2002/0091793 | A1 | 7/2002 | Sagie | |
| 2002/0100802 | A1 | 8/2002 | Sehr | |
| 2002/0100803 | A1 | 8/2002 | Sehr | |
| 2002/0100808 | A1 | 8/2002 | Norwood et al. | |
| 2002/0151364 | A1 * | 10/2002 | Suchocki | 463/42 |
| 2003/0033272 | A1 | 2/2003 | Himmel et al. | |
| 2003/0036425 | A1 | 2/2003 | Kaminkow | |
| 2003/0101145 | A1 | 5/2003 | Fang et al. | |
| 2003/0105641 | A1 * | 6/2003 | Lewis | 705/1 |
| 2003/0229793 | A1 | 12/2003 | McCall et al. | |
| 2004/0050933 | A1 | 3/2004 | Keronen et al. | |
| 2004/0099723 | A1 | 5/2004 | Allen et al. | |
| 2004/0117250 | A1 | 6/2004 | Lubow et al. | |
| 2004/0124246 | A1 | 7/2004 | Allen et al. | |
| 2004/0210759 | A1 | 10/2004 | Fitch et al. | |
| 2004/0267619 | A1 * | 12/2004 | Watts | 705/16 |
| 2005/0060173 | A1 * | 3/2005 | Hale et al. | 705/1 |

FOREIGN PATENT DOCUMENTS

| | | | |
|---|---|---|---|
| EP | 1 039 402 | A2 | 9/2000 |
| EP | 1 039 403 | A2 | 9/2000 |
| GB | 2403839 | A | 1/2005 |
| WO | WO 98/59324 | | 12/1998 |
| WO | WO 99/10824 | | 3/1999 |
| WO | WO 00/74300 | A1 | 12/2000 |
| WO | WO 01/17262 | A1 | 3/2001 |
| WO | WO 01/84474 | A2 | 11/2001 |
| WO | WO 01/86599 | A2 | 11/2001 |
| WO | WO 02/01485 | A1 | 1/2002 |
| WO | WO 02-01485 | A1 | 1/2002 |
| WO | WO 02-082386 | A1 | 10/2002 |
| WO | WO 03/034267 | A1 | 4/2003 |
| WO | WO 03/067369 | A2 | 8/2003 |
| WO | WO2004/003651 | A1 | 4/2004 |
| WO | WO 2004/036515 | A1 | 4/2004 |

OTHER PUBLICATIONS

Smart Cards Take Flight, EFT Report, New York, Aug. 11, 1999.*

The New York Pass—Making the most of your trip to New York, accessed via the Internet Archive http://web.archive.org/web/20020720081557/http://www.newyorkpass.com/.*

The New York Pass—Making the most of your trip to New York, 1 page printed from http://web.archive.org/web/20020720081557/http://www.newyorkpass.com/, printed on Feb. 29, 2008.

KiwiAble Leisure Card, 2 page document printed from http://web.archive.org/web/20010828155758/http://www.ccc.govt.nz/Programmes/KiwiAble/LeisureCard.asp, printed on Feb. 29, 2008.

Birmingham Sport and Leisure Leisure Card, 3 page document printed from http://web.archive.org/web/20030618051258/http://www.leisure.birmingham.gov.uk/l_card/l_card.htm, printed on Feb. 29, 2008.

The New York Pass—Welcome to the New York Pass, 1 page printed from http://web/archive.orq/web/20030212222558/www.newyorkpass.com/body/main.asp, printed on Nov. 18, 2009.

The New York Pass—Making the most of your trip to New York, 1 page printed from http://web/archivaorb/web/20030217210729/http://www.newyorkpass.com/, printed on Nov. 18, 2009.

The New York Pass—Attractions, 1 page printed from http://web/archive.org/web/20021119142524/www.newyorkpass.com/body/attractions.asp, printed on Nov. 18, 2009.

The New York Pass—Museums, 1 page printed from http://web/archive.org/web/20021013173733/www.newyorkpass.com/category_museums.asp, printed on Nov. 18, 2009.

The New York Pass—Sightseeing Cruises, 1 page printed from http://web/archive.org/web/20021215063437/www.newyorkpass.com/category_sightseeing.asp, printed on Nov. 18, 2009.

The New York Pass—Places of Interest, 1 page printed from http://web/archive.org/web/20021215054509/www.newyorkpass.com/category_poi.asp, printed on Nov. 18, 2009.

The New York Pass—See the Best of New York for Under $20 per day, 1 page printed from http://web/archive.org/web/20021103034458/www.newyorkpass.com/index.asp?ref=, printed on Nov. 18, 2009.

* cited by examiner

PROGRAMMABLE TICKETING SYSTEM

BACKGROUND OF INVENTION

1. Field of Invention

The present invention is directed to systems and methods for accessing facilities and, more particularly, for automatically and dynamically controlling access to facilities and for collecting and providing visitor data.

2. Discussion of Related Art

Tourism is a vital industry in many locations, including for example cities in the United States. A number of systems have arisen in the context of promoting tourism to generate interest in visiting attractions, such as museums, guided tours, rides, parks, etc.

In this context, others have provided systems where tourists may purchase a pass that can be used at a variety of attractions. One example is a pass that is good for access to more than one ski area. Another is a day pass that allows access to various attractions.

Smart card technology has become fashionable in a variety of contexts. A "smart card" is a card that is capable of storing data on it. Such data may be changed dynamically, such as a current financial balance for the card; the card may also include pre-programmed data that is not changeable by the user, such as a unique identifier for the card; other data. One example of a "smart card" is a plastic card the size of a credit card that has an embedded microprocessor for storing information, used for banking, medical alerts, etc. Such devices may be used by inserting the card into a reading device which includes a processor (or the equivalent) that may change the data on the card.

One use of a smart card for tourist attractions is to preprogram the card with the attractions that it is good for, and placing a reader at each facility. When a purchaser buys and uses the card (e.g., by "dunking" it in a reader), the reader can verify that the card has been programmed to allow access to this attraction.

In another example, a buyer may provide an identification card, such as a smart card with a unique ID, at the time of purchase of a ticket, pass, reservation, or the like, which identification may be electronically transmitted to a facility site (e.g., the attraction for which the ticket or pass was purchased). The buyer ID may be confirmed at the facility site, e.g., by presenting the smart card to a smart card reader, resulting in, for example, printing of a ticket, admission document etc. to allow the buyer access to the facility site. Some examples of such as system are described in U.S. Pat. No. 6,738,750 to Stone et. al, issued May 18, 2004.

SUMMARY OF INVENTION

According to one embodiment, there is provided a terminal for use in accessing a facility, the terminal comprising a smart card data mechanism to read and write information on a dunked smart card, a verification mechanism to receive an identifier on the dunked smart card and to determine whether the dunked smart card is authorized to access the facility, and a network access mechanism to connect to a remote system management computer to upload to the remote system management computer data corresponding to use of the facility by authorized smart card holders during a time period. The facility may be, for example, a paid attraction or may be a special-offer or discount.

According to another embodiment, a smart card for use in a geographical product may comprise a body portion and a memory in or attached to the body portion, the memory including a first data structure to store a card identifier, and a second data structure to store a product identifier, the product identifier corresponding to a set of promotions available in the geographical product. In one example, the memory may also store an activation stamp that may be used to determine whether the card is valid or expired. In another example, the memory may also include one or more counters that may be linked to promotions to indicate whether promotions have been used by the card or are available for access by the card.

One embodiment may include a product manager system to manage a system that permits access to rewards corresponding to a plurality of promotions, the plurality of promotions being included in at least one product, the system comprising a network interface to permit data access to reward terminals located in proximity to the plurality of promotions, a database to store at least one product definition, and a database to store data corresponding to actual use of the rewards. In one example, the product definition includes a list of the plurality of promotions.

Further aspects and embodiments include a method of computing compensation for an attraction based on actual use of smart cards at the attraction, the method comprising acts of recording a number of smart cards used at the attraction during a predetermined time period, recording a type of each smart card used at the attraction during the predetermined time period, recording data associated with each smart card; and determining the compensation based on the number, the type and the data. The type may indicate whether the card is an adult card or a child card. The data may include any of a time of use of the card, an origin of the purchaser of the card, an indication of other attractions accessed using the card, etc.

According to another embodiment, there may be implemented a method of activating a smart card for use in a multi-attraction access system comprising a plurality of promotions that can be accessed, the method comprising steps of providing a smart card, storing identification information on the smart card, providing the smart card with the stored identification information to an end-user, on a first use of the smart card to access one of the plurality of promotions, storing information on the smart card corresponding to the first use. In one example, the step of storing information may include storing a time stamp corresponding to a time of activation of the smart card. In another example, the method may further include a step of checking whether the card has expired by, for example, comparing a current time with the time stamp and indicating that the card has expired if the current time exceeds the time stamp plus a predetermined time interval.

Another embodiment may include an access system for use with user codes comprising a controller configured to be coupled to at least one reward terminal and configured to provide information to the reward terminal and receive data from the reward terminal once every predetermined time period, and a database, coupled to the controller, that stores the information to be provided to the reward terminal and the data received from the reward terminal, wherein the information includes a promotion list of promotions accessible from the reward terminal and a product list of promotions that are accessible with each user code, and wherein the data includes a list of user codes and promotions that have been processed by the reward terminal during the predetermined time period.

According to another embodiment, there may be provided a computer readable medium encoded with a plurality of instructions to be executed on at least one processor, the plurality of instructions implementing a method of controlling access to a plurality of attractions, the method comprising reading a card with a reader located at one of the plurality of attractions, recording a unique identification number of the card, comparing the unique identification number of the card with a product list of promotions that are accessible at the one of the plurality of attractions, and determining whether the card is valid for at least one of the promotions that are accessible at the one of the plurality of attractions. For valid cards, the method may further comprise steps of displaying a reward for the at least one promotion, and incrementing a promotion counter on the card to indicate that the reward has been given.

According to yet another embodiment, there may be implemented a method of creating a destination within a geographic location, the method comprising analyzing a plurality of attractions existing within the geographic location, rating each selected one of the plurality of attractions with a popularity index, building a matrix of the selected ones of the plurality of attractions, the matrix containing information about the plurality of attractions, the information including pricing information, location information and the popularity index, based on the matrix, selecting a plurality of partner paid attractions from the plurality of attractions, based on the matrix, selecting a plurality of special-offer partners from the plurality of attractions, and defining the destination as a collection of the selected partner paid attractions and special-offer partners.

According to other aspects and embodiments, a method of controlling access to a plurality of attractions may comprise acts of reading a card with a reader located at one of the plurality of attractions, recording a unique identification number of the card, comparing the unique identification number of the card with a product list of promotions that are accessible at the one of the plurality of attractions, and determining whether the card is valid for at least one of the promotions that are accessible at the one of the plurality of attractions. For valid cards, the method may further comprise steps of displaying a reward for the at least one promotion, and incrementing a promotion counter on the card to indicate that the reward has been given.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
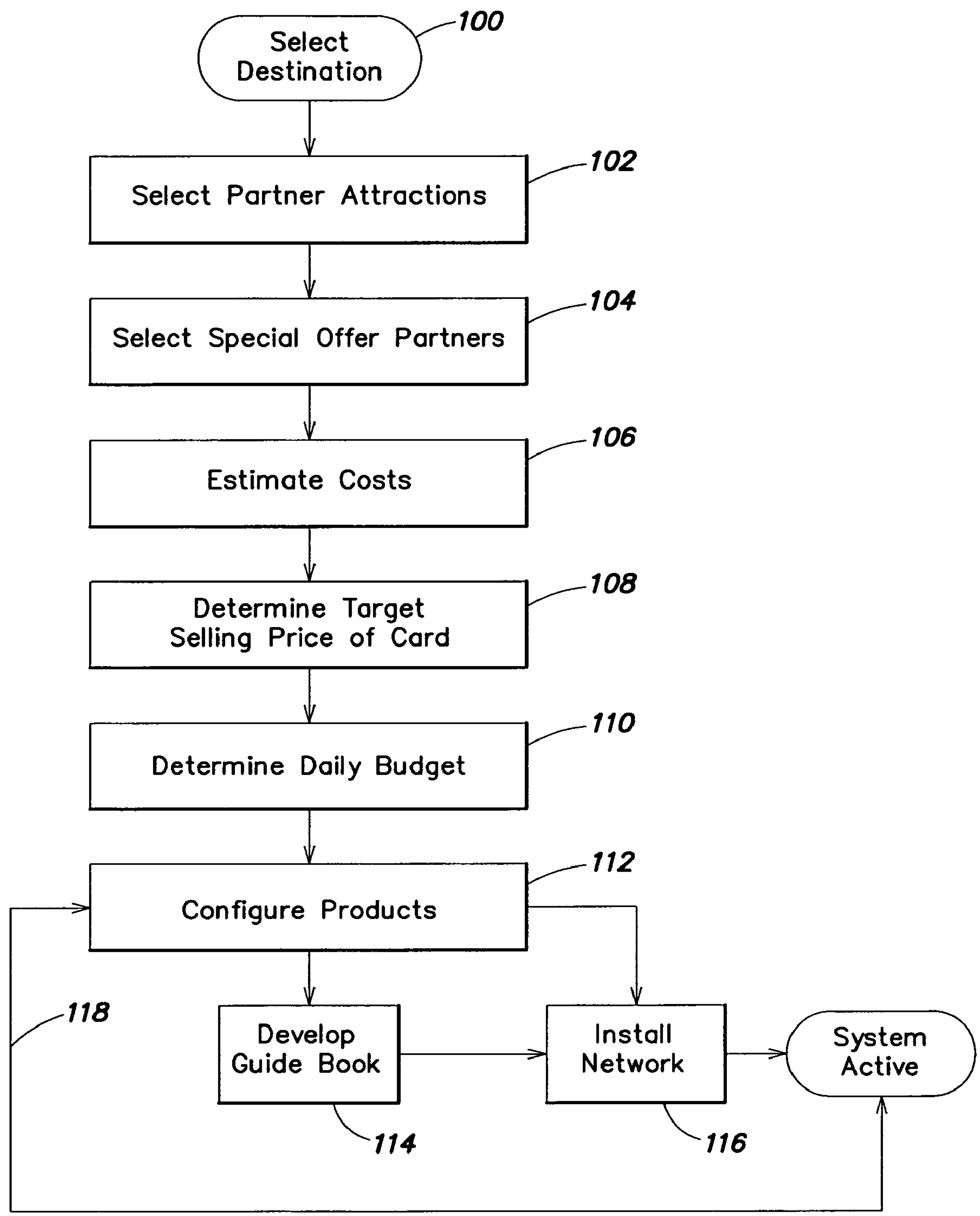
FIG. 1 is a flow diagram illustrating one embodiment of a method of creating a destination in which an access system is to be implemented.

Various embodiments and aspects thereof will now be described in detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof, herein is meant to encompass the items listed thereafter and equivalents thereof as well as additional items.

The embodiments below will be described in the context of providing an access facility for tourist attractions at a tourist destination, e.g., a system that allows coordinated access to a group of attractions in one geographical area. Certain aspects of the systems and methods described below have broader application and may, for example, be applied in the context of controlling or coordinating access to other types of facility, features, attractions, or resources. The context of the embodiments described below is not intended as limiting all aspects of the present inventions, except where the language of the claims expressly limits them in this manner.

A wide variety of tourist destinations such as, for example, cities like London, Boston, Chicago, New York and many others, offer an array of attractions such as museums, restaurants, historic buildings, galleries, shops and markets that are of interest to tourists. Conventionally, access to all the attractions at any one of such destinations is individually controlled and managed by the various attractions themselves. For example, a tourist wishing to visit a museum, a gallery and a restaurant, would travel to each of these attractions, queue and pay separately for access to each attraction using cash, credit card, travelers' checks, etc.

According to various embodiments and aspects of the present invention, there is provided a system and business model for allowing tourists access to a variety of attractions using a passcard that may be, for example, pre-paid. The system and methods described herein may offer value and convenience to tourists including special discounts and easy access to many attractions using the card, and in some examples can remove the need to queue and pay for each attraction separately. Certain embodiments of the systems and methods may also provide benefits for attraction managers and owners including encouraging visitors, greater visibility and simplified payments and certain embodiments may also allow greater flexibility and mechanisms for determining compensation of the attractions.

According to one embodiment, a system comprises a plurality of terminals that are located at various attractions and a plurality of cards that are used to access the attractions via the terminals. Visitors may obtain a card, for example, a smart card including embedded technology, that may allow them to access some or all of the attractions. Exemplary terminals and cards, and their operation, are described in more detail below.

Each terminal is coupled to a central controller that manages the system and collects data from the terminals. In this context, "coupled" includes any vehicle for communicating data, including for example a direct connection, a periodic networked connection. In one embodiment that is advantageous in a variety of contexts, the terminals may be coupled to the central controller once per night for batch-processing of the exchange of data.

Data communicated to the central controller may include data representing how many cards have been used to access the attraction at which each terminal located and may further include data about such accessing, e.g., the time(s) that cards were used to access the attraction or even identifying information about the specific cards used to access the attraction.

The central controller may be used to calculate compensation for each attraction based on level of use, e.g., the compensation for allowing the bearer of each card access to the attraction. The controller and its operation are described in more detail below. Thus, embodiments of the system operate to allow owners of cards access to multiple attractions without having to pay separately for each attraction. Rather, a person may simply pay once for a card and use that card to access attractions that are partners of the system.

Attractions may be paid by the system manager at the end of a day, week, month or other time frame, access fees corresponding to all the cards that have been used at that attraction during the time period, rather than being paid as a percentage of gross revenue for the cards (although in other embodiments, this latter method may be used).

Once a geographic location in which the system is to be implemented has been selected, a destination may be "created" by developing contractual relationships between the system manager and various paid attractions near or in the destination. It is to be understood that the term "destination," as used in this example, refers to a geographical area in which the access system according to various embodiments of the invention is implemented. A destination may be, for example, a city like Boston or New York, a resort or collection of resorts, a theme park or collection of theme parks, or any other geographic area that contains a viable number of attractions, as is discussed in more detail below.

The system manager refers to a company or entity (or group of entities) that endeavors to deploy the system at the destination. In doing so, contractual relationships may be formed between the system manager and each partner attraction. Where this is done, a variety of different types of contractual relationships may be formed. In one example, the system manager may contract with each attraction and compensate the attraction based on actual use by tourists. Where this is done, the system manager may seek a discounted rate from the attraction based on expected increased numbers of tourists visiting the attraction, or even a compensation rate that based on the actual number of tourists visiting the attraction or a charge per tourist based on time of day (e.g., less for off-peak hours or at the end of the day) or some other data such as country of origin of the tourist (e.g., less or more for visitors from far away). For example, the system manager may pay a partner attraction a first rate for the first fifty card-visitors per day and a discounted second rate for any additional card-visitors that day.

Factors that may be used in a formula that can be used to calculate compensation of an attraction may be simple (e.g., number of uses) or a little more complicated (e.g., a discount of the total admission price that would have been paid by users). Other factors include: time of day of use, day of the week, month (e.g., peak vs. off-peak season), etc. Other factors may be based on information about the visitor. For example, an attraction may find it desirable to receive a regular admission price for card-visitors it has strong reason to believe would come anyway, and charge a discounted rate for visitors it thinks it could not otherwise attract. Data about visitors that may be used to calculate compensation may include: geographical origin of the visitor, the difference in time between purchase of the card and its first use (e.g., distinguishing people who buy on impulse from people who plan well in advance), age group to which the visitor belongs, whether the visitor has also accessed related attractions (e.g., a visitor who accesses both a museum's special exhibit and its Imax theatre may receive a discount for one or both attractions). etc. For example, a children's museum may give the system manager a very low rate for adults who visit the museum in order to encourage adults to bring children to the museum who could not come on their own.

According to one embodiment, compensation to partner attractions may be time sensitive. For example, the system manager may compensate the partner attraction differently for card-visitors that visit the attraction at different times of day or year. In one example, a partner attraction may receive $10.00 for any card-visitors that access the attraction before 5 pm and only $5 (or nothing) for any card-visitors that access the attraction after 5 pm. In another example, an attraction may receive one rate of compensation for card-visitors that access the attraction during a peak season and a lower rate of compensation for card-visitors that access the attraction during an off season.

In one example, an attraction may charge the system manager a discounted rate for card-visitors and also require the attraction to accept acknowledgement of admission for card-visitors by installing and utilizing the smart card terminal provided to them by the system manager. The term "card-visitor" as used herein refers to a visitor to an attraction (e.g., a tourist to the destination) who has purchased a card (e.g., purchased directly or indirectly from the system manager) and is using the card to access the attraction.

Referring to FIG. 1, there is illustrated a flow diagram of one embodiment of a method for selecting a destination and configuring products for that destination. As discussed above, in a first step 100, the system manager may select a potential destination based on criteria such as the number and locations of attractions within the destination, the frequency of tourists to the destination, ease of traveling between attractions, etc. According to one embodiment, a destination may be selected based on a number of factors, including an estimated number of visitors, their typical visitation profile (e.g., do they come for a week or for a weekend), and the number of attractions that charge admission within the geographical area of the destination. These factors may be used to determine whether there will be enough visitors to the destination to make it commercially viable for the system manager and whether there will be value created for these visitors by the system, in other words, whether there are sufficient attractions within the destination that will agree to contract with the system manager to offer discounted rates and other special offers to card-visitors.

Partner attractions (e.g., paid-admission attractions that agree to contract with the system manager) may be selected based on a number of criteria. For example, it may be desirable that the partner attractions be of a certain quality so that card-visitors have a good experience at the partner attractions and the partner attractions reflect well on the system manager.

Partner attractions may be willing to provide the system manager with a proper discount to meet the needs of the system manager, particularly in systems that compensate partner attractions on a per-use basis. For example, an offered discount may allow a price for the card that encourages visitors to buy cards from the system manager but also makes partnering with the attraction commercially attractive to the system manager.

Another factor may be the usual price of admission to the attraction. For example, the partner attractions may typically not be too highly priced (relative to other attractions) because that may either drive up the price of the card such that customers do not want to buy them or may adversely affect the profits of the system manager. Other factors that may be taken into consideration are the popularity of the attraction, the estimated "dwell" time of visitors (i.e., how long does the average visitor stay at the attraction), and the distance to other attractions.

While not limiting with respect to all embodiments of the present invention, compensating partner attractions on a per use basis may permit the system to be put in place more easily. Partner attractions do not have the uncertainty of an unknown return on their participation in the system and, as described above, discounts can be determined based on volume, timing, or other data concerning the actual use of the attraction by card-holders. As discussed above, discounts may be time sensitive, may depend on the type of person (e.g., a adult versus a child), or other may be based on a combination of factors that may include characteristics of the attraction itself and/or the card-visitors. In another example, the system manager may subsidize discounts for various promotions. For example, a card-visitor may receive a 20% discount off the regular admission to a certain attraction, 15% of which may be covered by the attraction and 5% of which may be subsidized by the system manager.

In a next step 102, the system manager may identify potential partner attractions for the system to be implemented in the destination.

In selecting a destination, the system manager may consider not only potential partner attractions, but also "special-offer partners," namely shops, restaurants and other services that do not require paid admission, as illustrated by step 104. The system manager may contract with such special-offer partners to offer card-visitors special offers and discounts. Inclusion of special-offer partners may make the card more attractive to customers and offer customers greater value for the card. Ideally, the system manager may include enough of the area's popular attractions (both paid admission and other attractions) to interest potential purchasers and deliver an easily calculated value for them to choose to buy the card over buying tickets to each attraction individually.

According to one embodiment, once an initial assessment of the destination has been done by the system manager and a target selling price of the card is established, partner attractions may be selected using a "daily budget."

In this example, the daily budget is a measure of the amount expected to be paid by the system manager to the various partner attractions for the total use of a card. The budget may be based on the target selling price of the card, less any sales commissions that are expected to be paid to sales partners, less an estimated material cost of the system apportioned to one card, less a desired profit for the system manager. For example, for a two-day card, the budget calculation may be as shown below:

| | |
|---|---|
| Target Selling Price | +$69.00 |
| Average Commission | −$14.00 |
| Material Costs | −$4.00 |
| Desired Profit | −$10.00 |
| Daily Budget | =$21.00 (per day) |

In other words, for a two-day card sold for $69.00, the total cost (i.e., amount paid by the system manager to the partner attractions) for all the paid attractions visited by a card-visitor over the two days should be $42.00 (or $21.00 per day) and deals with partner attractions may be struck accordingly.

On the other hand, the above daily budget may be used to set the target selling price for the card. In this example, the system manager may determine that the average compensation to attractions is $21 per day and, therefore, the target selling price needs to be set at $69 in order to achieve a desired profit of $10.

Of course, it is to be appreciated that the above example is for the purpose of illustration only and is not intended to be limiting. The cards may be sold for any price determined to be appropriate by the system manager, and the costs and desired profits may also vary, resulting in a budget different than the given example. The numbers used to calculate the budget may all be based on an estimated most popular duration (i.e., based on an analysis of how long visitors typically spend in a destination city).

Referring again to FIG. 1 and this particular example, the system manager may calculate an average commission and average material costs in step 106. The average commission may for example take into account wages etc. paid by the system manager to its own or affiliated sales people or agents. According to one example, the average commission may be calculated based on an estimated number of sales people and cards sold over a given time period, to apportion an appropriate sales cost to each card. Similarly, the material costs may include a representation of the costs of manufacturing the cards and possibly also manufacturing, installing and maintaining the terminals and other equipment.

In step 108, the system manager may determine a target selling price for cards at the destination. The target selling price of a card may be determined based on many factors such as, for example, a price that will be appealing to the market, the amount of value that an average user will receive, and an anticipated redemption rate, i.e., a net amount that must be paid by the system manager to the partner attractions. In one embodiment of a business model, the value that an average card-visitor may receive from using the card may be noticeably lower than what it would cost that card-visitor to pay for each attraction separately, considering also that the card may provide special offers, such as discounts at shops and restaurants, in addition to admission to select paid attractions. The anticipated redemption rate may also be low enough to ensure a proper gross profit margin for the system manager. Considering all the above factors (and possibly other factors as well), pricing of the cards may be determined by balancing the interests of giving value to customers and acquiring desired profits so as to select appropriate partner attractions that make the model viable.

It is to be appreciated that the system and methods may allow for a several types of cards, for example, single-day cards, multi-day cards, adult cards, child cards, senior cards, multi-person cards, etc. Target selling prices may be calculated for each type of card to be available for use in the destination and the cards programmed (as described below) accordingly.

It is to be appreciated that the steps illustrated in FIG. 1 do not necessarily need to be performed in the illustrated and/or described order. The given flow diagram is merely one example of how a system manager may create a destination and is not intended to be limiting. System managers may perform these and other steps to create a destination in any order that they see fit.

Once the costs, desired profits and target selling prices have all been estimated or determined, the system manager may have a target daily budget for the cards, as illustrated by step 110. The budget may be one factor used to create commercially viable destinations for the system.

According to one aspect of the system, the budget may be used to develop "products" within a selected destination, in step 112 of FIG. 1 (although products may be developed in other ways as well, as would be appreciated by one of ordinary skill in the art based on the disclosure provided herein).

The term "product" as used herein refers to a collection of facilities, resources, attractions, or whatever is being allocated according to the system. In the context of the present example (and not intended to be limiting), "product" refers to a collection of promotions at a destination.

The term "promotion" as used herein refers to an offering by a partner attraction (for example, admission to a gallery or museum, a tour, admission to a movie or Imax production, etc.) or by a special-offer partner (e.g., a 20% discount for a restaurant, 10% off at a store, etc.).

There need not be any practical limit to the number of different promotions that may be included in any particular product. The system manager may try to anticipate which attractions will be visited the most and what is near them in both paid admissions (partner attractions) and special-offer partners in order to develop products that may be offered to card customers. Each card, when purchased by a customer, may be encoded with a selected product, as is described in more detail below.

Once the daily budget has been determined, the system manager may analyze the layout of the destination, taking into account all of the attractions, their proximity to one another, their popularity, the "dwell time" of visitors at each attraction, and also how much one person can do in one day. The system manager may use this information to construct initial configurations of products to be offered for a destination. Initial product configurations may be constructed based on, for example, the system manager's knowledge of the market (which may be gathered from analyzing data about visitors to the destination) and the available attractions.

According to one embodiment, initial product configuration may be determined using an information matrix. The destination may be divided into one or more geographic sub-areas and a separate information matrix may be created for each sub-area. The size and location of sub-areas may be defined based on a number of factors such as, for example, the geographic size of the overall destination area, ease with which visitors may travel around within the destination (e.g., does the destination have efficient public transport or do visitors need to walk or drive between attractions), traffic conditions within the destination, geographic topography of the destination, the number of attractions within the destination, and the like. Each information matrix may include data relating to potential partner attractions and potential special-offer partners.

According to one embodiment, each geographic sub-area should not have the opportunity to have too much in redemption payouts to partner attractions. In other words, each geographic sub-area may have sufficient partner attractions to be enticing to visitors, but not so many as to potentially require the system manager to have to pay more than the daily budget in fees to the partner attractions. This may be achieved by making sure that there are not too many partner attractions located too close to one another, and also that each geographic sub-area has enough special-offer partners to occupy visitors while not costing the system manager any money (in those embodiments where special-offer partners do not receive compensation; in other embodiments, special-offer partners may even be required to compensate the system manager based on use of the card).

One example of an information matrix for a geographic sub-area is shown below in Table 1. Each attraction may be assigned a subjective popularity rating based on any available data. In one example, estimated costs and an estimated number of partner attractions likely to be visited by card-visitors may be based on an 8-hour day to allow the system manager to attempt to manage costs per day and per hour using the information matrix.

TABLE 1

| Attraction | Retail Value ($) | Card Price ($) | Dwell Time | Distance from Other Attractions | Popularity |
|---|---|---|---|---|---|
| Museum | 12 | 8 | 90 min. | 1 min. | 20% |
| Historic Building | 5 | 4 | 25 min. | 15 min. | 40% |
| Art Gallery | 15 | 10 | 75 min. | 10 min. | 25% |
| City Tour | 25 | 16 | 125 min. | 1 min. | 70% |

In this example, once a daily budget is determined and potential partner attractions selected, the system manager may negotiate net rates with each of the partner attractions such that, when tested against maximum redemption (how much a person can physically do in a day), the total amount expected to be paid (per day) by the system manager to the partner attractions will not exceed the daily budget.

As should be appreciated from this specification, data gathering is possible in a way that allows assumptions to be tested or refined and the price of the card adjusted, or the various levels of compensation to attractions adjusted, as experience with the system is accrued.

According to one embodiment (e.g., one where attractions are compensated based on actual use), the system manager may collect data representative of all uses of all cards in the destination and analyze the data to determine the amount owed to each partner attraction by the system manager.

In one example, the system manager may pay each partner attraction monthly for all the card uses at that attraction. Of course, it is to be appreciated that the system is not limited to monthly payments. The system manager may negotiate and contract with each partner attraction to pay that partner attraction over any predetermined time period, for example, daily, weekly, bi-weekly, or any other mutually acceptable time period. In this example, the system offers the benefit to partner attractions of simplified payment, namely, that they may be paid once in a time period, for example, once a month, for all card-visitors to the attraction, rather than accepting multiple individual payments for each visitor at the time of each visit. Various examples of payment systems and data collection are described in more detail below.

Once a destination has been created by developing contractual relationships with various partner attractions (paid attractions) and special-offer partners, the destination may be considered ready for launch. A destination that is ready for launch may have enough value created in total admission prices and key attractions signed (confirmed partner attractions) to be reasonably expected to attract customers.

According to one embodiment, the system manager may develop and produce a guidebook or brochure that may include descriptions of all partner attractions and special offer partners in the destination (step 114). The guidebook may be provided or sold to customers who purchase cards to assist the customers in planning and visiting desired attractions. The fact that a system manager may provide a guidebook may be an additional incentive for special-offer partners to join the system because the book may be a form of advertising for the special-offer partner and increase the visibility of the special-offer partner.

In addition, the system manager may install terminals at each of the partner attractions and configure a network of smart card readers (step 116), as is discussed in more detail below. When the book, smart cards and terminals are all complete, the destination may be launched, i.e., the system may become active in the destination.

Once a destination is launched, the system manager may collect data about card usage in the destination, as is discussed in more detail below. According to one embodiment, the system manager may analyze the data and compare it to the list of partner attractions and special-offer partners and add or subtract attractions or negotiate better pricing to maximize profit. The system manager may also use the collected data to reconfigure products (as illustrated by line 118) offered in the destination to improve, for example, the value added by the card and the profits achieved by the system manager.

Figure 2:
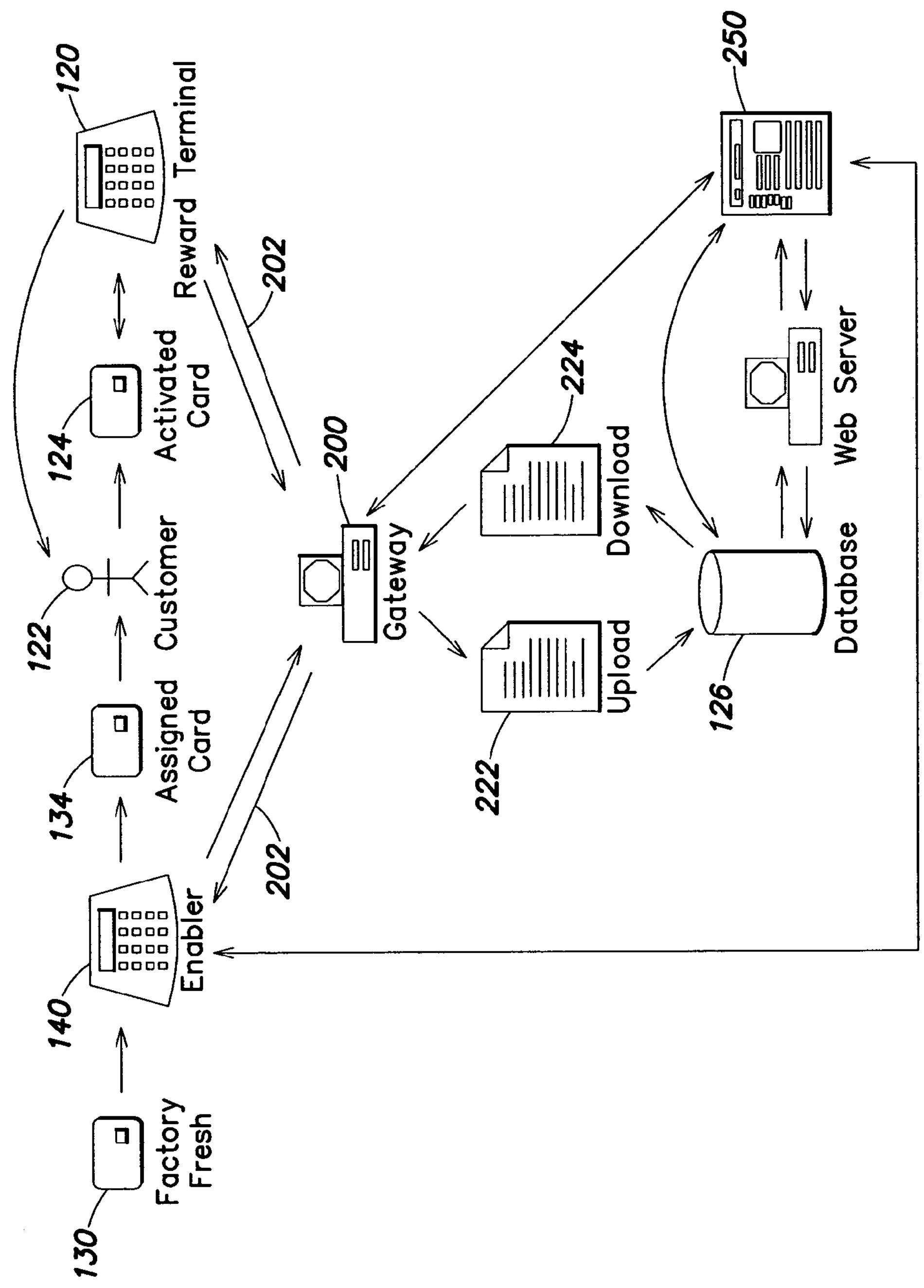
FIG. 2 is a schematic diagram of one embodiment of an access system according to aspects of the invention.

Referring to FIG. 2, there is illustrated a schematic diagram of one embodiment of a system according to certain aspects of the inventions.

The system may include one or more reward terminals 120 which may be configured as smart card readers, as is described in more detail below. A reward terminal 120 may be located at each partner attraction and be configured to read cards 124 presented to it and to indicate whether or not a card-visitor 122 has access to the attraction.

A database 126 may be included (shown in this example as stored in a central location, run by the system manager, and updated over a network with nightly downloads to the terminals of any changes to products that use this attraction (and the cards that therefore allow access) and uploads to the database of actual use data) to store data relating to the system, cards, partners, etc., as is discussed in more detail below. "Database" as used herein includes any data structure to store data and a "database" may be a collection of separate databases or a subset of data in a larger database; "database" includes information intended to be archival or used only for temporary storage.

Embodiments and aspects of the access system and methods described herein implement all-inclusive ticketing to destination attractions (partner attractions) and discounts etc. at special-offer partners such as shops and restaurants. According to one embodiment, there may be provided a highly secure and efficient system based on smart card technology and requiring no paper transactions.

As discussed above, partner attractions and special-offer partners offer promotions such as, for example, admission to a museum or gallery, discounts at shops and restaurants, etc., to card-visitors. Promotions may be accessed using a purchased card via, for example, a reward terminal. According to one embodiment, each promotion may have a unique promotion code that may be stored by the system, for example, in database 126 illustrated in FIG. 2. Promotions may be company-wide or venue-specific. For example, a company (either a partner attraction or a special-offer partner) that has multiple locations might have one promotion that is good at all locations and individual promotions for specific locations. For example, a restaurant chain may offer a lunch special that is good at all locations, but a dinner special that is only good at one location. Partner attractions and special-offer partners may communicate with the system manager to set up the promotions that they wish to offer. These promotions may be altered at any time by agreement between the partner attraction, or special-offer partner, and the system manager in the manner (for example) described herein.

According to one embodiment, promotions may have constraints that control when, where and/or how often a card-visitor may access the promotion. Promotions may be constrained for example in time. Some examples of possible time constraints include time of day, day of the week and date. For example, a promotion may be constrained to be valid only from noon to 3 pm on Wednesdays during the month of June. Time constraints may be agreed upon between the partner attraction (or special-offer partner) and the system manager and may also be altered whenever suitable.

In another example, promotions may be constrained by quantity. In other words, a card-visitor may be limited to a fixed number of uses of a promotion during the lifetime of a card. For example, a card-visitor may be allowed to take a tour at any time during the lifetime of a card, but only once. In another example, promotions may be constrained by how often they are used in a given time period. For example, periodicity may be defined in terms of a calendar. This means that a promotion may be constrained to a certain number of uses in a single day or number of days. For example, a museum may offer free admission to a card-visitor every day, but only once a day. In another example, the card may be used more than once per day, but not twice within an hour This may be done, for example, to help assure that only one person is using a card.

Any of time, quantity and frequency of use constraints may be set up by the system manager in agreement with the partner attraction or special-offer partner and may be changed at any time. In addition, promotions may be constrained in a combination of time, quantity and frequency of use. The system allows the system manager, and therefore the partner attraction or special-offer partner, to configure promotions to have whatever constraints may be desirable and to modify the promotions whenever necessary.

According to one embodiment, every promotion may have an absolute time period (which may be never ending) along with modifications that make the promotion only good on certain days of the week and/or at certain times of the day. Partner attractions and special-offer partners may design their offers to meet business specific needs, for example, driving business at off hours. The system manager may program each promotion to have the tailored features and restrictions desired by the partner attractions and special-offer partners. In appropriate contexts, this flexibility can facilitate reaching an appropriate agreement on the level of discount provided to the system manager.

As discussed above, "products" includes collections of promotions. There may be no limit to the number of promotions that can be included in a product.

According to one embodiment, each product may have a unique product code and cards may be enabled with this code when they are purchased by customers. Thus, in this example, cards used in the system may be programmed with a particular product code, rather than (or in addition to) each of the promotions that make up the product. Then, product identifier controls what set of promotions the user can use. A product may not have a time limit, however, system operators may typically create new products seasonally, or if attractions within a destination change.

Various embodiment of the system are designed to use smart cards to allow customers to access and use the system. Smart cards are often implemented as credit-card sized plastic cards that have an embedded, programmable microchip that includes a memory or storage device. Such cards may be ordered from the manufacturer in the "factory fresh" or new state.

Figure 3:
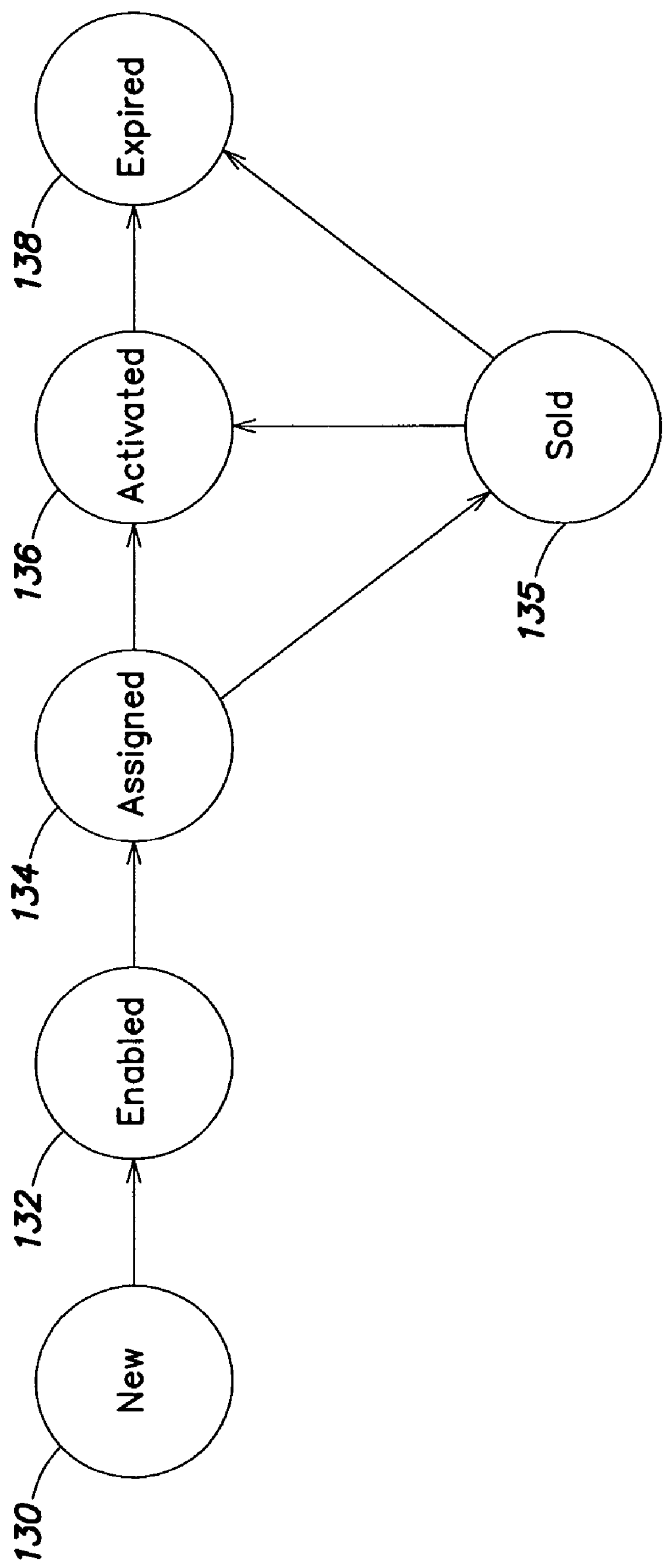
FIG. 3 is a flow diagram of one example of a life-cycle of a smart card used with the system.

Referring to FIG. 3, there is illustrated a flow diagram of one example of a card "life-cycle." In the new state 130 a card may have the system manager graphic printed on the front and/or the back and the card has a unique serial number programmed into the serial number field of the card. In one example, the serial number may also printed on the back or front of the card. In addition, the card may have a security code, for example, a default security code programmed at the factory, programmed into the card's memory. One example of smart cards that may be used with the system are SLE 4442 Secure Memory Smart Cards which can be purchased from a number of smart card manufacturers including, for example, CardLogix, GemPlus and TxSystems. It is to be appreciated however, that the system is not limited to this specific type of smart card. In addition, although a preferred embodiment of the system and methods described herein may be implemented using smart cards, the system and methods are not so limited and may be implemented using unique bar-codes or pin numbers that may be supplied to customers instead of smart cards.

After new cards 130 have been obtained by the system manager, the cards may be enabled by an enabler 140 (see FIG. 2). New cards 130 become enabled cards 132 when they are programmed with a specific period, type and product. In addition, the card's security code may be changed from the factory default to something only known by the system manager network. This may prevent fraudulent cards from operating in the network.

According to one embodiment, the enabler 140 may be a smart card enabled point of sale terminal, similar to the reward terminal 120. One example, of a terminal that may be used as an enabler for the system is an Allegro 100 terminal from Intellect. However, several manufacturers (e.g., Hypercom, Verifone, Lipman, and others) produce smart card enabled POS terminals that may also be used.

The Enabler may be used to transform new cards 130 into enabled cards 132. An enabled card may have additional features programmed into the card compared with new cards 130. For example, an enabled card may have a card type (e.g., adult, child or senior), period (for example, a two-day card may be programmed as such) and a product (represented by a product code) programmed into the card.

Figure 4:
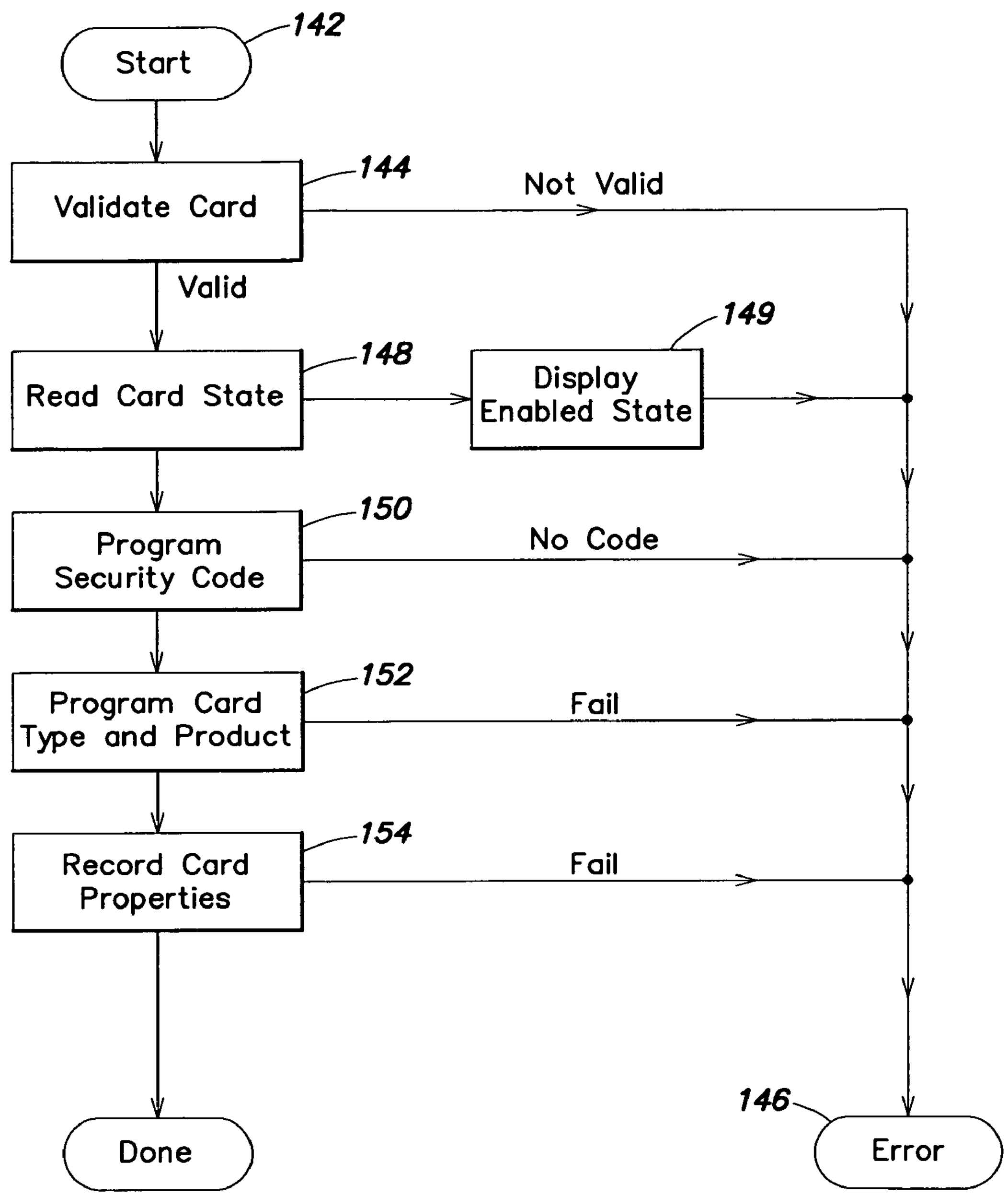
FIG. 4 is a flow diagram of one example of an enabling procedure used to enable cards to be used with the system.

Referring to FIG. 4, there is illustrated a flow diagram of one example of a procedure that the enabler 140 may implement to turn new cards 130 into enabled cards 132. In a first step 142, an operator may swipe or "dunk" a new card into the enabler terminal. The enabler may interrogate the card to determine if it is a system-compatible type of smart card, for example, an SLE 4442 based smart card, in step 144. If not, an error is indicated, as shown by box 146 and enabling is discontinued. If the card is a valid type, in a next step 148 the Enabler may read the state of the card. If the card is already enabled, then the terminal displays a report of the current enabled state including the card type, period, and product, in step 149. Enabling is discontinued and the enabler may display an error (box 146). If the card is not valid and not yet enabled, the enabler may proceed with the enabling process.

It is to be appreciated that the terms "swipe" and "dunk" are used interchangeably in this disclosure and are intended to mean any manner in which a card may be read by a terminal including, but not limited to, swiping the card through a terminal, inserting the card into the terminal, contactless reading/writing of the card by the terminal, etc.

According to one example, in a next step 150, the Enabler may override the factory default security code on the card and program the card with a new security code that is known only to the system manager network. If the card does not have the factory default security code present on the card, the enabler may display an error (step 146) and enabling may be discontinued. In a next step 152, the enabler may program the card with the card type (e.g., adult, child or senior), period (e.g., one day, two day, one week) and product by writing representative codes into predefined fields of the smart card. If the card fails to program, the operator may be told of the error (step 146) and enabling is discontinued.

Once the enabler has programmed the card, the enabler may record the card serial number, and the programmed product, period and type along with the current date and time in a memory device of the enabler. This information may be transferred later to the Gateway as is discussed below in more detail. Finally, the operator may remove the card from the enabler. The card is now enabled and may be referred to as an enabled card. Enabled cards are ready to be sold to customers for use with the system. While enablement may be done at the point-of-sale, enablement may also be done in advance as described below.

Referring again to FIG. 3, after cards are enabled, they may be assigned to a particular sales channel to be sold to customers, thereby becoming "assigned" (block 134). Cards become assigned when the card is promoted to the assigned state in the database 126 (see FIG. 2). The act of assigning a card to a sales venue in the database promotes the card to the assigned state. At this point in the lifecycle, the card can be sold by the sales venue to the customer. Assigned cards become "sold" (block 135) when the card is sold to a customer.

Figure 5:
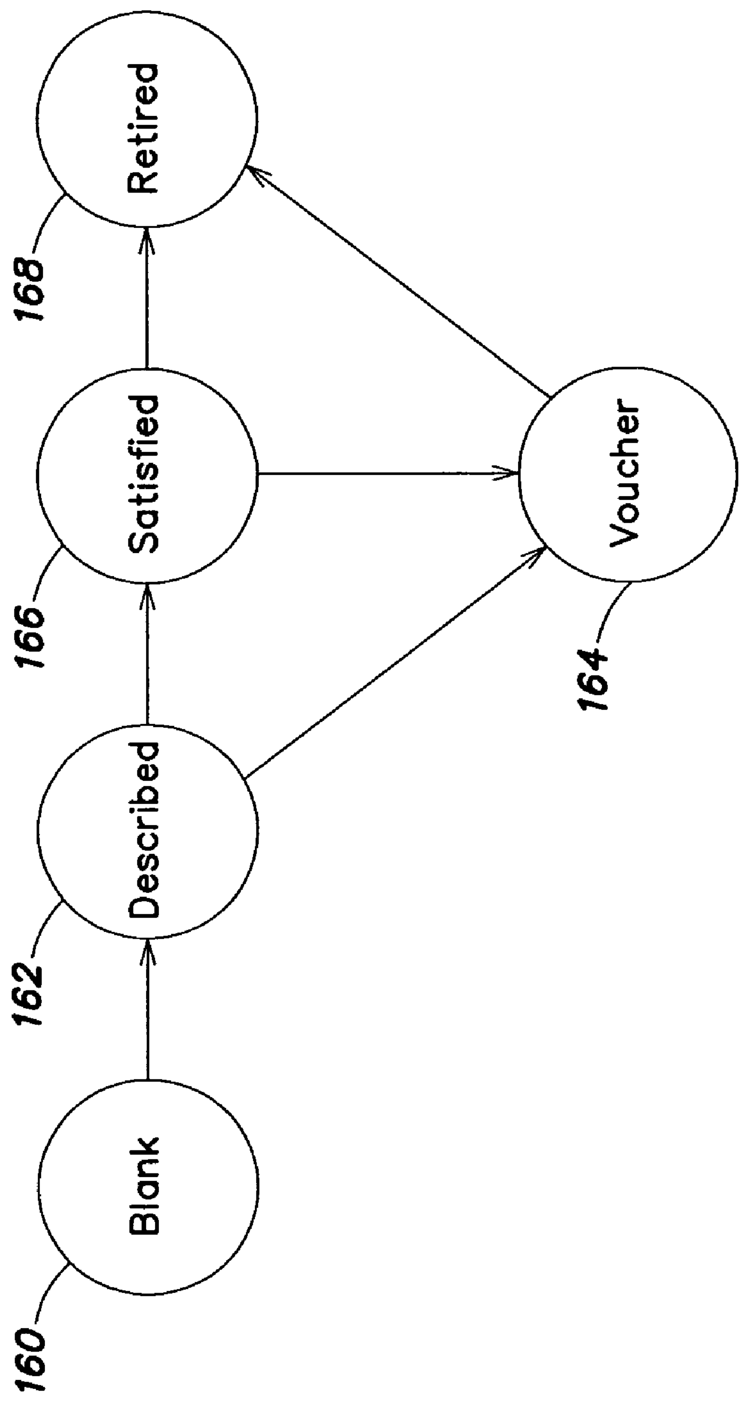
FIG. 5 is a flow diagram of one example of an order life-cycle according to aspects of methods of the invention.

According to one embodiment, the system manager may use an order system to track sales of enabled cards. A "sold" card may generate an order that is used to track payment for the card. Orders may begin in a blank state, as shown by block 160 in FIG. 5. An order may be used to eventually tie a customer, the sales agent, and the card product together. Order data may then be used for a variety of purposes including determining how much sales commission is to be paid to agents, popularity of various types of products, and other uses described in more detail below. Blank orders may become "described" when a sales agent, customer and card product are specified in the order, indicated by block 162. Described orders may become "voucher" (block 164) when the customer has confirmed the purchase of a card. However, in this state, a card has not been assigned to the order and payment is not yet due. Described or voucher orders may become satisfied (block 166) when a card is assigned to the order. At this point in the order lifecycle, the card is in either the activated 136 or sold 135 state (see FIG. 3). Finally, orders may become retired (block 168) when payment has been received for the order.

As discussed above, products may be programmed into cards during enabling (step 152).

In one embodiment, a product may be represented on the card as a particular code, for example, as a 32 bit number. An important feature of the system may be that no list of promotions may be included on the card. Rather, the card is programmed with a product code that defines the promotions for which the card is valid.

Referring again to FIG. 2, the system may include a database 126. According to one embodiment, inside the database 126, product definitions may be maintained as lists of promotion codes, for example, as lists of 32 bit numbers. These lists may be changed at the database 126 without changing the product codes on the cards. For example, if a product code X includes promotions A, B and C, then it may be changed, in the database, to include promotion D as well. Thus, a card that is programmed with product code X may now be used to access promotion D without any change needing to be made to the card (after the terminal has connected to the database to receive the updated information; e.g., after a nightly updating over a network).

In this fashion, a product can be changed even after a card has been enabled and sold and a card already programmed with a particular product code can be used at a terminal with new or modified promotions, as is discussed in more detail below. System operators can add, subtract or modify the individual promotions in a product (thus changing the product definition) without access to the card. This allows the system manager to alter products without recalling sold cards and reducing or avoiding inventory problems with "out-of-date" cards.

According to one embodiment, the system manager may install one or more reward terminals 120 at each partner attraction. The reward terminal 120 may be a smart card enabled point of sale terminal adapted to read cards 124 presented to it and indicate whether or not a card-visitor 122 has access to the attraction. More specifically, the reward terminal 120 may include a storage element, such as a computer-readable memory device, that may contain a list of promotions that may be valid at that reward terminal. For example, a reward terminal located at a museum that is a partner attraction may store several promotions (e.g., access to the museum, access to special exhibits, access to an Imax theatre, and discounts at the museum restaurant) that may be offered by the museum to card-visitors. When the card 124 is "swiped" or "dunked" at the reward terminal 120, the reward terminal 120 checks to see if the card 124 is still valid (e.g., has not expired), whether the card is supported at the terminal and whether the promotions in the terminal are available to the card-visitor. If a promotion is valid, then it may be offered and a reward may be displayed. If more than one promotion is valid, then an attendant may make a choice and the appropriate reward may be given.

The term "reward" as used herein refers to a signal or indication that a card-visitor has chosen to access an offered promotion. In other words, a card-visitor receives a "reward" when the card-visitor uses the card to access a promotion. A promotion, as stored in the system, may have a title and a reward. The title may be used to identify the promotion. For example, a card-visitor who swipes his/her card at a reward terminal may be offered a promotion having a title "admission to museum." The reward is used to reward the card-visitor, namely to indicate to attendants at the partner attraction that the card-visitor is entitled to the selected promotion. During normal operation of the system, an attendant, or the card-visitor, may select a promotion by its title and may be told the reward by the promotion reward. A card may have a certain number of rewards based on the product associated with that card. In other words, a product comprises a list of promotions and each promotion may correspond to one or more rewards. For example, as discussed above, promotions may be frequency or quantity limited which may determine how many rewards that promotion may give to any card.

The reward terminal 120 may be any suitable type of smart-card enabled terminal. Some examples of reward terminals that may be used in the system include point of sale terminals manufactured by Hypercom, Verifone or Lipman. One specific example of a reward terminal 120 that may be used in the system is an Allegro 100 terminal from Intellect. However, the system is not limited to any specific type or model of terminal. In some embodiments, automatic dispensers including card-readers may be provided so that a separate line may be used to gain access (e.g., a dispenser to issue tickets), offering the possibility of reduced waiting times for card-visitors.

Referring again to FIG. 3, in this example, cards become "activated" when a card-visitor first swipes a card at a reward terminal. The day of activation may be recorded on the card so that, from that day, the card may be valid for the pre-programmed card time period. These time periods (e.g., a day) may be computed from the time of activation (e.g., a 24-hour period) or may correspond to window within, for example, a 24-hour period, such as the time from when the card was activated up until, for example, midnight on the day it was activated.

Figure 6:
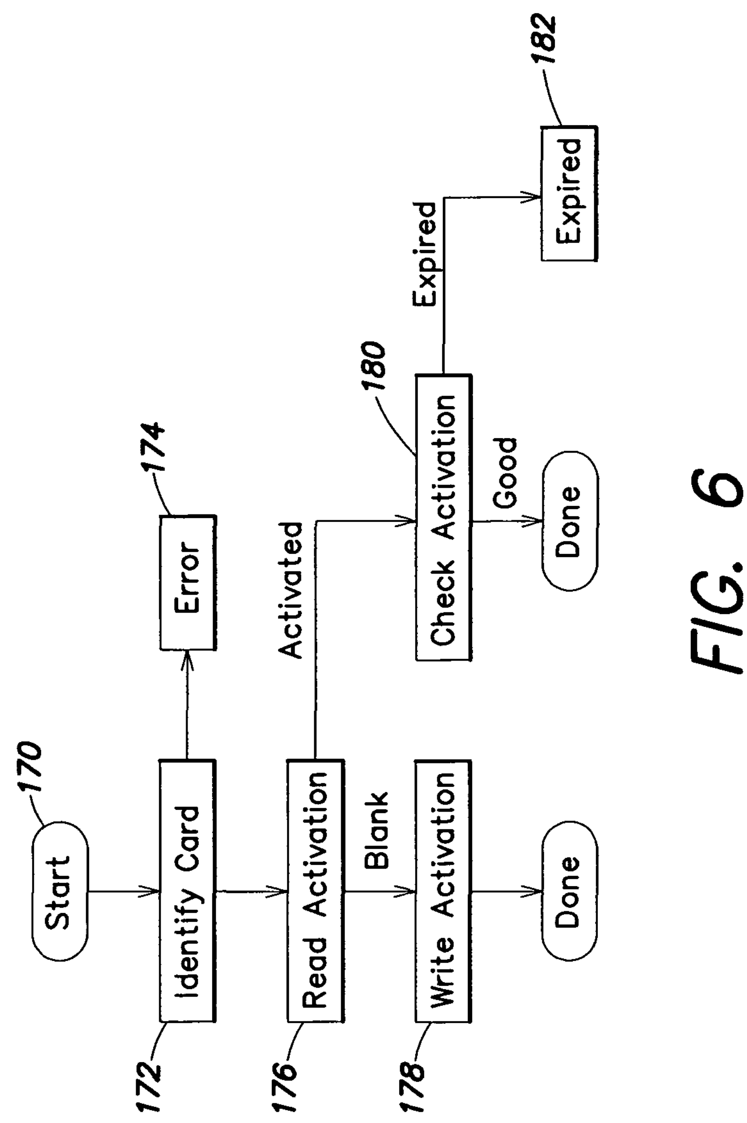
FIG. 6 is one example of a flow diagram showing activation of a card by a reward terminal 120.

Referring to FIG. 6, there is illustrated one example of a flow diagram showing activation of a card by a reward terminal 120. In this example, the card is "activated" (for purposes of determining when the card then expires for cards that expire based on a time period) on first use. For cards that do not expire, it may be that the card need not be activated after it is initially set up or the card may be activated at the point of sale. Other activation events are possible as well.

Other expiration events are also possible. For example, a card may expire after a certain amount of use (e.g., aggregated and stored on the card). One such embodiment would be to set the card to expire after $50 of aggregated use at attractions, where the value of aggregated use is stored on the card. For example, a card may be encoded with a product that includes both a list of promotions (use of which is subject to promotion constraints) and a fixed money amount for travel or food, for example. In this case, the card may expire for use associated with food or travel when the fixed money amount is reached, but may remain valid for accessing promotions. Another expiration event could be, for example, non-use for a certain period or a use (or attempted use) after a certain date or time of day. In another example, a card may expire when all its rewards have been used up. Other expiration events may be some algorithm or formula based on these or other factors.

Returning to the example of FIG. 6, when the card-visitor (or an attendant at a partner attraction or special-offer partner) swipes the card in the reward terminal (step 170), the reward terminal identifies the card (step 172) as a system card (i.e., an enabled card).

If the card is not recognized, an error is displayed (step 174) and no reward may be given to the card-visitor.

In a next step 176, the reward terminal may read the activation timestamp on the card. If the activation stamp is blank (or has some other entry indicating that it has not been activated), then this is the first use of the card, and the reward terminal proceeds to step 178, where the reward terminal writes the activation timestamp into an appropriate field on the smart card. Once the activation has been recorded, the reward terminal may proceed to determine the promotions available to the card-visitor, as is discussed in more detail below.

If, in step 176, the activation stamp contains a date, then this card has been activated before and the reward terminal proceeds to step 180 to check the activation. In step 180, the reward terminal reads the activation timestamp from the smart card and reads the card period from the smart card. If the current time is less than the activation timestamp plus the card period, then the card is valid and the reward terminal may proceed to determine the promotions available to the card-visitor. If the current time is greater than the activation timestamp plus the card period, then the card has expired. If the card is expired, the reward terminal may display a "card expired" message to the user and discontinues card processing (step 182). Other embodiments, e.g., where activation any time during one time period (e.g., any time during the day) causes expiration at the end of that time period may likewise be implemented, e.g., where a use at any time during a day causes the card to expire at the end of that day.

As discussed above, one of the components of the system may be a reward terminal 120. A reward terminal may include a user interface such as a screen and keyboard and swipe slot for cards. The reward terminal may constantly or regularly check for user activity which may signal that a card-visitor is attempting to use the reward terminal or that an operator is attempting to, for example, query the number of records currently stored on the reward terminal (indicating how many promotions have been accessed that day at that reward terminal). When a card is swiped at the reward terminal, the reward terminal may begin to implement a procedure for processing the swipe.

Figure 7:
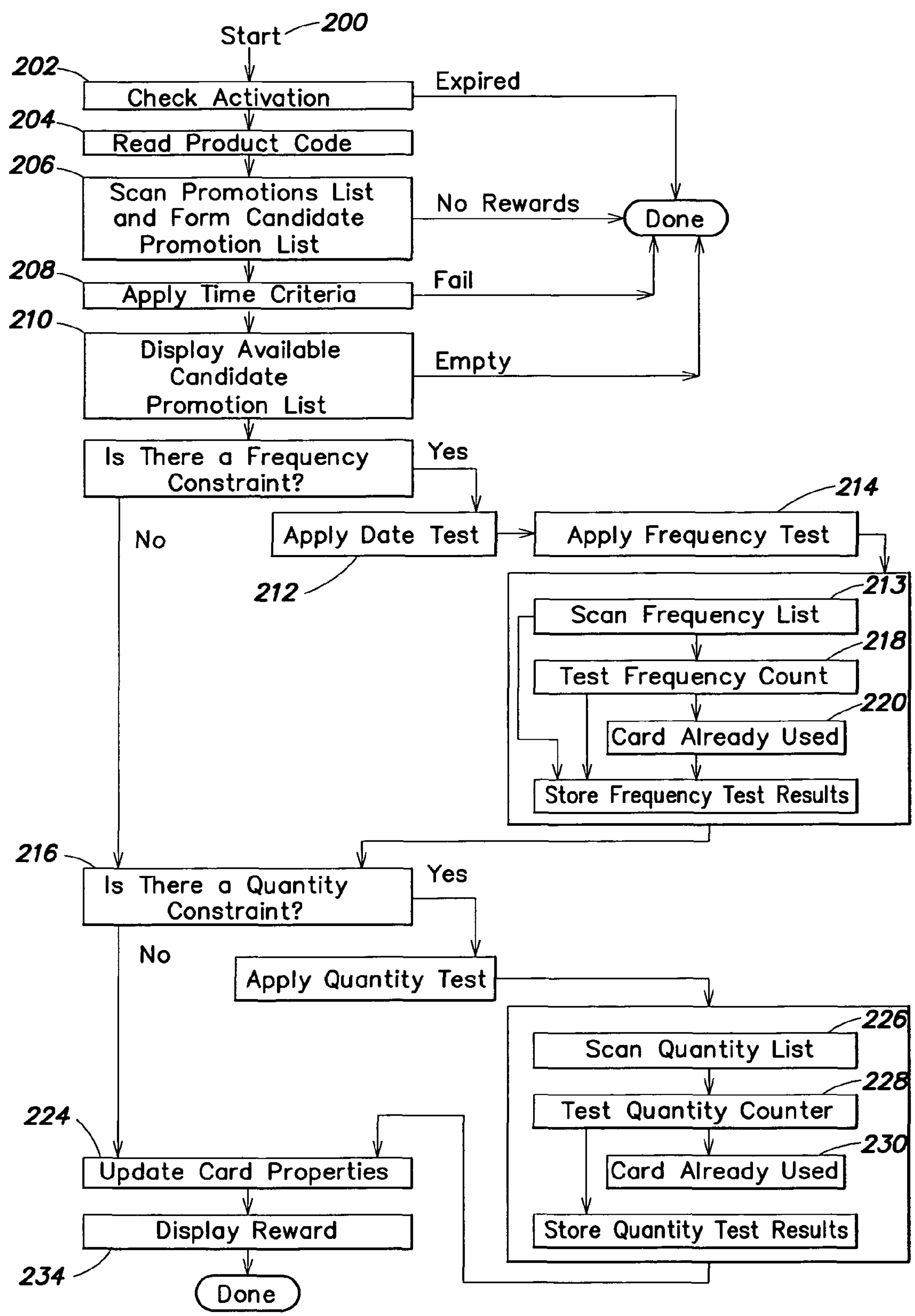
FIG. 7 is a flow diagram of one example of a procedure that may be implemented by a reward terminal when a card-visitor attempts to use a card to access a promotion.

Referring to FIG. 7, there is illustrated a flow diagram of one example of a procedure that may be implemented by a reward terminal when a card-visitor attempts to use a card to access a promotion. The card-visitor 122 may give the smart card 134 to an attendant or operator who swipes the card into the reward terminal 120 (step 200), or may dunk the card themselves in an automated kiosk. As discussed above, the reward terminal may check the activation state of the card and may proceed if the card is valid (step 202). Next, the reward terminal may read the product code from the smart card (step 204).

Figure 8:
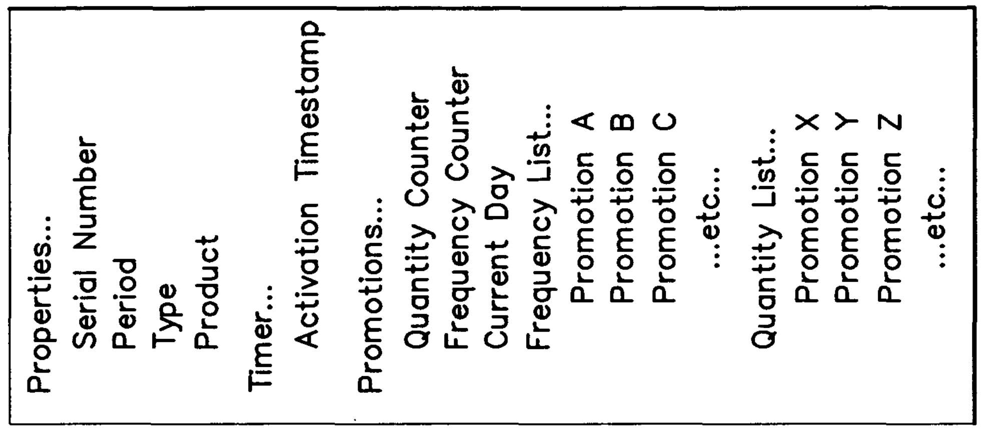
FIG. 8 is a conceptual diagram of information that may be stored in a memory structure of a smart card that may be used with the system.

The example of FIG. 7 may be more easily understood with reference to one example of a memory structure for a smart card. Referring to FIG. 8, there is illustrated a conceptual diagram of information that may be stored in a memory structure of a smart card that may be used with one embodiment of the system. The smart card memory may contain several "properties" fields that contain information relating to the properties of the card, such as its serial number, period, type and programmed product code. As discussed above, each card may have a unique serial number that identifies a particular card in the system.

When the card is swiped in a reward terminal (step 200), the reward terminal may record this serial number along with the date and a promotion code for later transmission to the database 126, an example of which is described below. The "period" field may include a number indicating how many days the card is good for starting at midnight of the day of first activation. The reward terminal may use this number to determine if a card is still valid in step 202.

The "type" field in this example indicates the card type (e.g., adult, child, senior, etc.). This type code may be used to display the card type to the attendant when necessary. For example, a reward message might be "admin one adult" and the "adult" part is determined from this field. As discussed above, the product code indicates what product the card supports. The reward terminal may use the product code, in step 204, to find the list of promotions that are valid for the current customer.

Referring again to FIG. 7, once the reward terminal has read the product code from the card, the reward terminal may scan a list of available promotions loaded in the memory of the reward terminal (step 206). Each reward terminal may be programmed with a list of promotions that may be accessed via that reward terminal. This list may correspond to a list of the promotions offered by the partner attraction at which the reward terminal is located. The reward terminal may then form a list of candidate promotions (step 206) that are included in the product identified in (as read from) the card (e.g., matching the product code). If the list of candidate promotions is empty, then the operator may be told that no promotions are available and the process may be terminated. If the list contains one or more candidate promotion, then processing proceeds.

In this embodiment, in a next step, the reward terminal may scan the list of candidate promotions and compare them with the time criteria for each promotion (step 208). If the promotion fails the time criteria, for example, it is the wrong time of day or day of the week for a card-visitor to access that promotion, then the promotion is dropped from the candidate promotion list. After the time criteria have been applied, if the candidate list is empty, then the operator may be told that no rewards are available and the process may be terminated. If the candidate list has more than one entry, then the title of each available promotion may be presented to the operator and the operator may select which promotion to process (step 210). If there is only one available promotion, then the title of that promotion may be displayed, and the terminal may proceed with processing that promotion.

After a promotion has been selected for processing, the reward terminal may check to see if any frequency (step 214) or quantity (step 216) restrictions exist for that promotion. It is to be appreciated that although the flow diagram illustrated in FIG. 7 check frequency constraints first and then quantity constraints, the method is not so limited and the steps may be performed in any order configured by the system manager. If the selected promotion has a frequency constraint, then the terminal may apply a frequency constraint test (step 216).

According to one embodiment, a frequency constraint test may be conducted as follows. The reward terminal may read the date from the card and check to see whether it matches the current date (step 212). If the current date does not match the date on the card, then the frequency list on the card is old and the card passes the frequency constraint and the reward terminal may continue processing at step 216. If the current date does match the date on the card then the frequency list on the card is valid and may be examined to determine if the promotion passes. In one example, the reward terminal may scan the frequency list (step 213) on the card looking for the promotion code of the selected promotion. If no promotion code is found, then the card passes the frequency constraint and the reward terminal may continue processing at step 216. If the promotion code is found, then the reward terminal may examine a frequency counter (step 218) on the card in the frequency list that includes the promotion code. If the frequency counter is less than the frequency constraint, then the promotion passes and the reward terminal may continue processing at step 216. If the card's frequency counter is equal to the frequency count, then the promotion has been used and the reward terminal may display a message to tell the operator that the reward has already been used for the day (step 220) and processing is terminated. In one example, the reward terminal may store the promotion code and frequency counter in its memory for later update of the card state, as is discussed in more detail below. As one of ordinary skill would appreciate based on the disclosure provided herein, any number of possible frequency constraints maybe imposed for a particular promotion and the mechanisms for storing and tracking frequency constraints using the memory of a card device may be varied. As just one example, a frequency constraint may be depend on more than one variable, such as allowing a larger number of uses (or unlimited use) on weekdays, and lower frequency on weekends.

Returning to this example, once the reward terminal has processed any frequency constraints, the reward terminal may check to see if the selected promotion has a quantity constraint (step 216). If the promotion does not have a quantity constraint, then the reward terminal may proceeds to step 224 to update the card state in the card memory, as is discussed in more detail below. If the promotion does have a quantity restriction, the reward terminal may scan the quantity list on the card looking for the promotion code of the selected promotion. If no promotion code is found, then the card passes the quantity constraint and the reward terminal may proceed to step 224. If the promotion code is found, then the reward terminal may examine a quantity counter (step 228) for the entry in the quantity list that contains the promotion code. If the card's quantity counter for that promotion is less than the quantity constraint, then the promotion passes and the reward terminal may proceed to step 224. If the card's quantity counter for that promotion is equal to the quantity count, then the promotion has been used and the reward terminal may display a message to tell the operator that the reward has already been used and processing is terminated (step 230). In one example, the reward terminal may store the promotion code and quantity count in its memory for later update of the card state, as is discussed in more detail below. As for frequency counters, the quantity counter tests may be formed from as logical tests, such as permitting any use after the first one only a weekday or a weekend day after 4 pm.

Once processing has been completed and the reward terminal has determined that the card-visitor is entitled to access the selected promotion (i.e., card is valid and all time, frequency and quantity restrictions have been passed), the reward terminal may display the promotion reward for the operator (step 234).

Referring again to FIG. 8, the card may include an activation timer field that indicates the date and time when the card was first activated. As discussed above, when the card is first swiped through a reward terminal, the reward terminal may write the system time into this field. In one embodiment, the reward terminal may maintain the system time as the number of seconds since the beginning of the epoch. The epoch may be defined to begin at a time when the system is launched in a destination, or another time selected as suitable by the system manager. On all subsequent swipes of a card after the first swipe, the reward terminal may read the activation system time from the card and add the card period in seconds. For example, for a two-day card, the card period may be 172800 seconds. If the sum of the activation system time and the card period is less than the current system time, then the card has expired. Of course, it is to be appreciated that the system is not required to maintain records of system time in seconds but may instead use a different time tracking method; similarly, for embodiments that expire based on time, other measure may be used such as having all one-day cards expire at 11:59 pm on the day of first use (no matter what time the card was first used). In one example, the reward terminal may be configured to account for leap years in its time tracking method. In another example, the reward terminals may not account for daylight savings, in order to facilitate moving of reward terminals from one location to another, and thus may receive daylight savings time information from a central computer, as is discussed in an example below.

According to one embodiment, the card may also include in its memory one or more counters. For example, a card may include a quantity counter and a frequency counter. In one example, the quantity counter may include a number that indicates the number of quantity promotions currently included in the product stored on the card. As discussed above, promotions may be limited in either quantity or frequency or both and may also be unlimited in both quantity and frequency. For a promotion that is limited to a specific number of uses during the lifetime of the card (a quantity limited promotion), the promotion code may be recorded in a quantity list on the card. As discussed above, whenever a card is swiped at a reward terminal, the reward terminal may check to see if the promotion quantity has already been used by that card-visitor (step 214, FIG. 7). The card may also include a frequency counter that may include a number that indicates the number of frequency promotions currently included in the product code stored on the card. For promotions that are limited to a specific number of uses per day (a frequency limited promotion), the promotion code may be recorded in a frequency list on the card. Whenever a card is swiped at a reward terminal, the reward terminal may check to see if the promotion frequency has already been used by that card-visitor (step 212, FIG. 7).

In one example, the card may also store an indication of the current day of the month. As discussed above, the terminal may use this day indicator to determine if any of the entries in the frequency list are valid (step 212, FIG. 7). If the current day on the terminal is not equal to the current day on the card, then the list on the card is considered old and is ignored. If a frequency promotion is consumed, then a new list may be started on the card and the current day field may be reset to the current day on the terminal.

As discussed above, the card may store a frequency list which may be a list of frequency promotions that have been used by the card-visitor during the current day. According to one example, the frequency list may contain number pairs. The first number of a pair may indicates the number of times the promotion has been used (i.e., may correspond to the promotion counter). The second number of the pair may be used to indicate the promotion code. When a reward terminal checks to see if a frequency promotion is available, it may scan this list for the applicable promotion code (step 213). It may then compare the number of times the promotion has been used with the promotion limits (step 218). If no more rewards are available, the reward terminal displays the "no more rewards" message (step 220). If more rewards are available, then the reward terminal may increment the promotion counter (step 224) and display the reward message (step 234).

Similarly the card may store a quantity list which may include a list of quantity promotions that have been used by the customer during the lifetime of the card. Like the frequency promotion list, the quantity list may comprise number pairs. The first number may indicate the number of times the promotion has been used (i.e., may correspond to the promotion counter) and the second number may indicate the promotion code. When a reward terminal checks to see if a frequency promotion is available, it may scan this list for the promotion code (step 226). The reward terminal may then compare the number of times the promotion has been used with the promotion limits (step 228). If more rewards are available, then the terminal may increment the promotion counter (step 224) and display the reward message (step 234). If no more rewards are available, then the reward terminal displays the "no more rewards" message (step 230).

As discussed above, the reward terminal may, in step 224, update card propertied and counters on the card before displaying the reward and terminating processing of the card. for example, the reward terminal may update the frequency and quantity list information on the smart card to indicate that one more promotion has been consumed. Such updating may prevent "double-swiping" from occurring in the system.

According to one embodiment, the system may be an "offline" system or a batch processing system, where the reward terminals do not require access to a central database at the time of card use (unlike online credit card systems, for example, which are authorized at a central location on a per-use basis).

“Double swiping” as used herein refers to a card being swiped twice at the same attraction. This can happen if the card is used twice at the same reward terminal or used again at another reward terminal with the same promotion. For example, some attractions may have multiple entrances and so have more than one reward terminal installed with the same promotions. To prevent “double swiping,” the reward terminal may record the promotion code and count on each card that is processed in the system. As discussed above, the reward terminal may apply a series of constraints to a card to see if it can be used to satisfy a promotion at the reward terminal. In the embodiments discussed above, two of these constraints may involve how often and how many times the card has been used. Since the cards used in the system are smart cards, it is possible to record how many and how often a particular promotion has been used in the card’s promotion counters. Each time a promotion is used, its counter may be incremented on the card by the reward terminal. Thus, to prevent double swiping, the reward terminal may find the promotion count of the current promotion on the card and test to see if it meets or exceeds the limit of how many rewards the card-visitor is entitled to. The reward terminal will not offer a reward if the promotion count has reached its limit, thereby preventing double-swiping. As may be appreciated, frequency limits may also prevent or discourage double-swiping by preventing two people from visiting the attraction at the same time.

In addition to writing updated information to the card, the reward terminal may store in its memory device information such as, for example, the date and time when the reward is issued, the serial number of the card used and the promotion code of the promotion consumed. This information may later be transmitted to the database 126. When the reward terminal is not processing a user request, such as a request for access to a promotion, the reward terminal may enter an “idle” mode wherein it may display, for example, the system manager logo and instructions for how to swipe a card at the reward terminal.

Referring again to FIG. 2, the system may include a gateway 200 that may communicate with the reward terminal 120 as indicated by lines 202. According to one embodiment, the gateway 200 may be a standard personal computer or mainframe computer that may be running an operating system such as Linux or Microsoft Windows™. In a preferred example, the gateway may include a PowerEdge 400SC from Dell running Red Hat versions 9 Linux. However, the system is not so limited and it is to be appreciated for example that any server grade computer from any of the major manufacturers including, for example, Gateway, Dell, HP, IBM and the like, may be used in this example of the system. Likewise, any major Linux distribution may be used including SuSe, Mandrake, Debian, and others in addition to Red Hat. The gateway may form an interface between the reward terminals and the central database 126. It is to be appreciated that although the gateway and the database are illustrated in FIG. 2 as separate and discrete items, the database may be a storage element located on or attached to (e.g., an external hard-drive) the gateway computer and need not be physically separate from the gateway.

The gateway may contain a number of programs that are configured to control data flow between the enabler, the reward terminals, the database and the gateway. According to one embodiment, these programs may include, for example, a loading program that may be, for example, a script program, that may be run daily to process files uploaded to the gateway from the enabler and the reward terminals. The load program may include any necessary information for the gateway to properly acknowledge each terminal and may manage where received files are stored in the gateway’s storage device. Another program may be, for example, a generate program that may generate the loading script program. The generate program may query the database for a list of active terminals and generate an upload processing script that includes those terminals. In one example, the act of generating the upload script may be called “generating a new network.” New networks may be generated at various times, for example, when a new partner attraction or special-offer partner is added to the system or when a new promotion is added or changed at an existing partner attraction or special-offer partner. Another program that may be included in the gateway is a “snapshot” program. The snapshot program may generate an email that is a snapshot of current network activity. In one example, the snapshot program may be run automatically every day to give the system manager a quick view of the significant activity in the system for the previous day. This may be useful for getting a quick idea of how many customers used the system, what they did and what terminals were used. Alternatively, a system manager operator may request that the snapshot program be run, rather than automatically running the snapshot program.

According to one embodiment, reward terminals 120 and the enabler 140 may communicate with the gateway via phone lines or direct serial links, as indicated by lines 202 in FIG. 2. It is to be appreciated that although the following discussion may refer primarily to communication between reward terminals and the gateway, the same principles may apply to communication between an enabler and the gateway. Reward terminals 120 may log into the gateway computer 200 using a remote login, for example, a Unix style remote login. Once connected and recognized by the gateway computer 200 the reward terminals 120 may invoke a gateway program to perform the communication protocol. In one example, the protocol allows for the reward terminal 120 to send its stored records to the gateway 200.

As discussed above, during enabling of a new card, the enabler stores in its memory a record containing the card properties and the card serial number (step 154, FIG. 4). According to one embodiment, these stored records may be uploaded 202 to the gateway 200 and then stored in the central database 126. In one example, each day, the card enable records may be batched up and sent to the gateway 200. Similarly, when an activated card is swiped in a reward terminal, a record containing the card serial number and promotion code used is stored in the reward terminal’s memory. Each day, the transaction records may be batched up and sent to the gateway 200.

It is to be appreciated that the system may allow for records to be sent to the gateway more (or less) frequently than once a day and may operate always or part of the time in an “online” mode wherein records may be continually, or semi-continually, sent to the gateway. However, in one example, the system may operate as an “offline” system that only requires batch processing. In this example, records may be stored at the enabler and at the reward terminals and uploaded to the gateway once a day (or once every time period, that time period being selected by the system manager and possibly being longer or shorter than one day). It is also possible to allow an attraction to trigger an upload where, for example, an attraction is added during the day or where an exchange of data is required for debugging, customer service or some other need.

Figure 9:
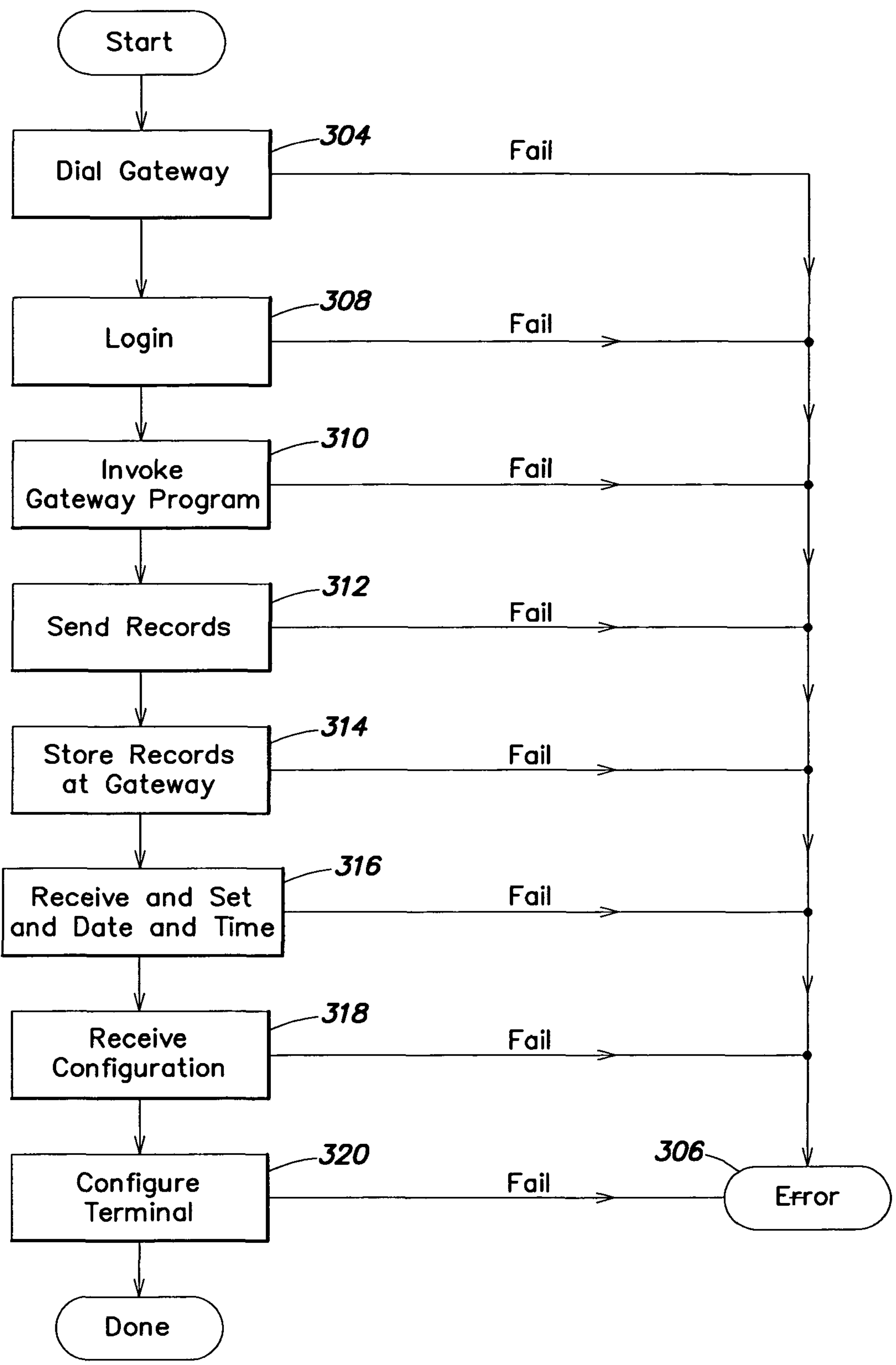
FIG. 9 is a flow diagram of one example of a procedure for sending records to the gateway.

One example of a procedure for sending records from either the enabler 140 or the reward terminal 120 to the gateway is illustrated in FIG. 9. It is to be appreciated that for the purposes of this explanation, the term "terminal" may be used to refer to the enabler, the reward terminal, or a kiosk or other device that includes the functionality of one or both.

To begin a batch upload, an operator may initiate communication between the terminal and the gateway, or the terminal may initiate communication on its own at a preprogrammed time. In one example, the terminal may communicate with the gateway over a phone line. In this example, the terminal may initialize a modem and dial a phone number of the gateway (step 304). If the gateway does not respond, the terminal may terminate the process and display an error (step 306). Once the gateway has been reached, the terminal may log into the gateway by giving it a username and a password, for example, using Unix rlogin (step 308). If the gateway does not recognize the terminal, then communication may be terminated and the terminal may display an error (step 306). When the terminal has connected to the gateway and logged in, the terminal may invoke the gateway program (step 310) to handle the communication protocol, as discussed above. If the gateway does not start the program, then the communication is terminated and the terminal may display an error (step 306).

In a next step, the terminal may send its stored records to the gateway (step 312). In one example, each byte of a record may be compared with an echoed character and each record may be validated, e.g., by checksum. If a record transfer does not succeed, then communication is terminated and the terminal may display an error (step 306). If the record transfer is successful, the gateway may write the records to its memory (step 314) or an attached storage device. For example, the gateway may write the received records in an ASCII file which may be called a terminal data file and include a serial number of the terminal as its name with the extension ".in" to indicate that it is an incoming record file.

In a next step 316, the gateway may send a record containing the current time and date to the terminal. This record may also be validated with checksum and further security or validation mechanisms may also be included. If the record transfer does not succeed, then communication is terminated and the terminal may display an error (step 306). Once the terminal has received the date and time from the gateway, it may update its internal records by setting its time and date to the information received from the gateway. In this manner, all terminals may be controlled to maintain the same system time that is regularly received from the central gateway. This may eliminate the potential of time drift among the different reward terminals which could potentially cause problems with properly validating cards at the reward terminals.

In one embodiment, the gateway may also send a stored configuration to the terminal (step 318). The configuration may be stored in, for example, an ASCII file that includes the terminal serial number as its name with the extension '.out' to indicate that it is an outgoing configuration file. As discussed above, each byte may be compared with an echoed character and each record may be validated with checksum. If a record transfer does not succeed, then communication is terminated and the terminal may display an error (step 306). The configuration file sent to each terminal may include, for example, updated product definitions that may add or subtract promotions from products. As discussed above, by implementing the product system wherein product definitions are stored on the reward terminals, the system manager is able to modify products by reconfiguring the product definitions at the reward terminals without needing access to the cards. Once the terminal has received the configuration file, the terminal may delete its old configurations and configure itself to the information downloaded from the gateway (step 320). The terminal may then clear its memory of all records that have now been sent to the gateway and is ready to store new records.

It is to be appreciated that the configuration may also be sent to the terminal before the date and time is sent rather than afterwards as illustrated in FIG. 9. In this example, the gateway may acknowledge the transmission of records from the terminal to the gateway and sends the current terminal configuration. The terminal may acknowledge receipt of the configuration file and ask for the current date and time. The gateway may then send the date and time, after which the terminal may acknowledge receipt and terminate the connection. As discussed above, all transmissions may be verified via checksum and handshake.

According to one embodiment, the terminal may continually or regularly check to see if it is time to call the gateway. As discussed above, each day at a predetermined time, the terminal may attempt to establish communication with the gateway. If it is successful, the terminal may follow the procedure described above, or a similar procedure, to transfer records to the gateway and receive configuration information from the gateway. In one example, if the terminal is not successful in establishing communication with the gateway, it may proceed with a second attempt. For example, if the terminal and the gateway are communicating via a phone line, the terminal may attempt to call a secondary number for the gateway or may try to call again at a later predetermined time. The system manager may configure the terminal to attempt to contact the gateway a set number of times after which, if all fail, it may display an error.

Referring again to FIG. 2, the gateway computer 200 may upload 222 and download 224 information to and from the database 126. According to one embodiment, the gateway may run an upload program once a day (or once every predetermined time period which may be longer or shorter than one day) to store any records uploaded from the enabler 140 and the reward terminals 120 in the database 126. The upload program may be, for example, a C program that reads the record files sent by the terminals and stores the information in the database via SQL. However, it is to be appreciated that the upload program may be written in a language other than C and may use a different process to transfer data between the database and the gateway than is described herein. One example of a procedure for uploading a terminal data file from the gateway to the database is given below. However, one of skill in the art will recognize that there are many different methods for transferring data between computers and storage devices and the system is not limited to the example given below. In addition, as discussed above, the database and the gateway may reside on the same computer base and ordinary methods known in the art may be used to access and store data in the database.

Figure 10:
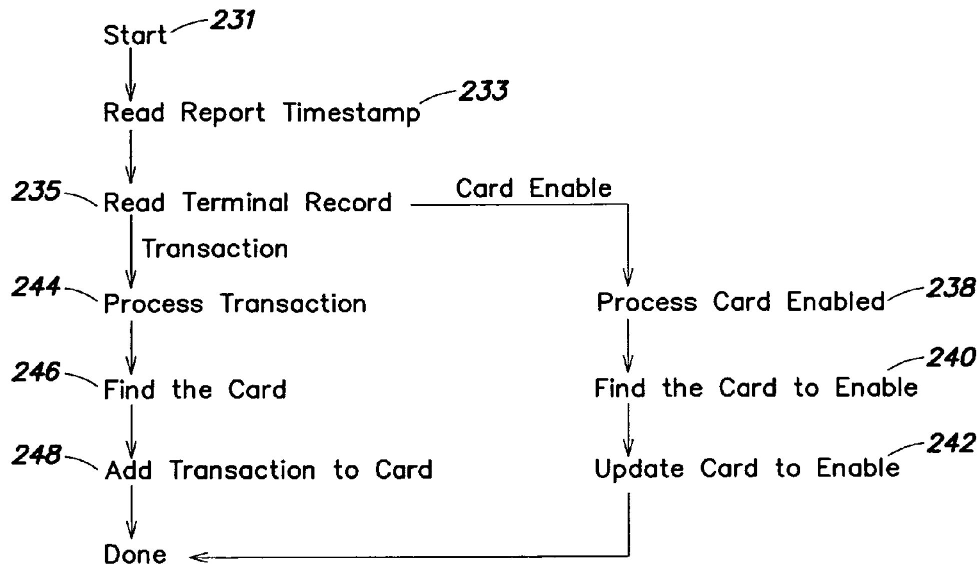
FIG. 10 is a flow diagram of one example of a procedure for uploading information from the gateway to the database.

Referring to FIG. 10, there is illustrated in flow diagram form one example of a procedure for uploading information from the gateway computer 200 to the database 126. In a first step 231, the upload program may open the terminal data file to obtain data from the terminal file. A terminal file may be a record file received by the gateway from either a reward terminal or the enabler. Next, the upload program may read the terminal report timestamp record and store that time (step 233) in a report log table of the database, which is described in more detail below. This table may contain the report history of a terminal. In one example, the upload program may read a terminal record (step 236). If that terminal record is a card enable record (received initially from the enabler), then the upload program may read the timestamp, serial number, period, type and product code of the card enable record (step 238). The upload program may then locate the card in the database card table that has that serial number and update its properties to reflect the properties of the card as specified by the card enable record (step 240). If the card cannot be found, an error may be displayed and the process terminated. If the card is found, the state of the card may be updated in the database to reflect that the card is now enabled (step 242).

If step 234 reveals that the terminal record is a transaction record from a reward terminal, the upload program may read the timestamp, serial number, and promotion code of the transaction record (step 244). The upload program may then locate the card in the database using the serial number (step 244). If the card is not found, an error may be displayed and the process terminated. If the card is found, a record may be added to the transaction table in the database that contains a reference to the card record in the card table and the transaction properties (step 248). The process may be repeated until there are no more records to upload.

Similarly, when required, an operator may run a program on the gateway computer that generates new terminal configuration files from the database. The gateway may then send these configuration files to the terminals, as discussed above. According to one example, the download program may operate similarly to the upload program and may be a C program that reads terminal configuration information from the database and stores it in ASCII files. These files may be named as the serial number of the terminal plus the extension "out," as described above. According to one example, the download program may connect to the database and find an appropriate terminal in the terminal table by serial number. The download program may write the auto dial time (for the terminal), terminal time zone and dialing prefix to the configuration file. In addition, the download program may write account information, such as, for example, the phone number, username and password of the Gateway, to the configuration file. The download program may also find the set of promotions assigned to the terminal and write their properties, such as time, frequency and quantity restrictions, to the configuration file. Furthermore, the download program may locate the set of products that may be enabled with the terminal and write their properties to the configuration file. Thus, the configuration file may contain all information necessary for the terminal to properly process a card presented to it.

One of ordinary skill in the art would appreciate, based on this disclosure, that there would be many methods for controlling data transfer between a computer and a database and the system is not limited to the specific example given above. In addition, as discussed above, the database may in fact be a storage device that is located at the gateway computer. In this case, methods known in the art may be used by the gateway computer to access the database and obtain information therefrom or write information thereto.

As mentioned above, according to one embodiment, the database 126 may contain a number of tables in which card records, product definitions and other information may be stored. For example, the database may include a company table that may contain the properties of all partner attractions and special-offer partners participating in the system. Some of these properties may include, for example, relationships between companies (partner attractions or special-offer partners) and their venues (e.g., whether a company has one or multiple venues, where their head office is located, etc.)

Another table that may be included in the database is a card table that may hold the properties of all cards that are currently known to the system. For example, the card table may hold the serial number of each card. After the card has been enabled, the card table may contain the card properties (type, period and product) associated with the serial number. In addition, product and company properties may be included in the card table as references to other tables.

Another table that may be included in the database may be a transaction table that may hold records of all the processed swipes in the system. The transaction table properties may include the time and date of each swipe and the location (i.e., the terminal) where the swipe occurred. Transactions may also reference what card was used and what promotion was used.

In addition, the database may include a promotion table that holds the definitions of all the promotions offered by the partner attractions and the special-offer partners. The promotion definitions may include the title and reward of the promotion and the constraints (e.g., time, quantity and frequency) of the promotion. Promotions may also reference the company (or more accurately, the venue of a company) offering the promotion. This may be done by including in the promotion table references to the company table.

The database may also include a product table holds the definition of the products offered in the system. The product definitions may include a name and a description and the and "one-to-many" table may relate what promotions are included in what products. The card table may reference the product table to tie cards to a particular product, i.e., a list of available promotions. In one example, the actual product code programmed into a card may be used as the product table identifier.

Thus, the database, in these and other tables, may keep a record of what is happening in the system, including changing product definitions and data relating each transaction (such as a request to access a promotion) that occurs in the system.

This data may be useful to the system manager, to partner attractions and/or to special-offer partners. For example, the card data may include information about the purchaser of the card such as, age bracket, home country if the customer is a foreign tourist or home city if the customer is a domestic tourist, etc. The data may also include a record of all promotions accessed by that card and therefore that customer. Therefore, considering all the data for all cards in the system, users may be able to create statistics about card-visitor demographics. For example, a user may be able to determine that adult card-visitors from England typically visit museum x, take a city tour and hardly ever go to Imax theatres. For another example, a user may be able to determine that card-visitors with children (i.e., customer has bought an adult card and a child card) prefer museum Y, but also usually take city tours. This information may be useful to the system manager to better configure the system to add value for customers. The system manager may also choose to sell or provide the information to partner attractions and/or special-offer partners so that they may be able to tailor promotions to encourage visitors. This information may also be provided or sold to third-parties, although in many instances measures may be taken to assure that the privacy of customers is preserved, such as assuring that no data is provided to any third-party or attraction that allows an individual customer to be identified.

According to another embodiment, because product definitions may be maintained at the central database, the system may include products from other competing companies that may be adapted to become system manager products. In other words, because product definitions may be changed by the system manager without access to the cards, there is no inventory required to create and offer new products. Therefore, the system manager may create, in the central database, products that may include offerings from other companies and that may be accessed using the same cards. Through the central database, terminals may be updated to recognize different types of cards and different products without any need to modify the cards or the system infrastructure.

Referring again to FIG. 2, the system may include a central user interface 250. Via the user interface 250, a system manager controller may access the system network and run programs on the gateway or store or retrieve data from the database 126. It is to be appreciated that although the gateway 200 the database 126 and the user interface 250 are illustrated in FIG. 2 as separate units, they may all be combined on a single (or distributed) central computer.

Figure 11:
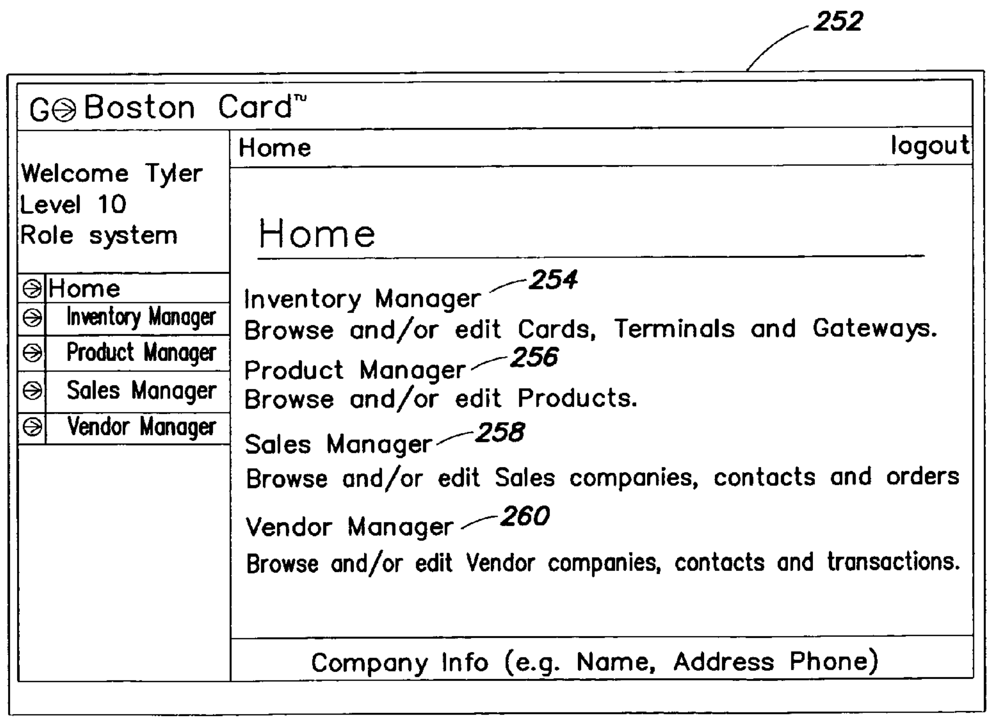
FIG. 11 is a representation of one example of a graphical user interface that may be provided to system manager users.

Referring to FIG. 11, there is illustrated one example, of a graphical user interface 252 that may be presented to system manager users on the user interface 250. In the illustrated example, the interface 252 may operate using a selection of "managers." However, it is to be appreciated that the graphical user interface may be implemented in any number of ways as may be desired by the system manager.

According to one example, the interface 252 may include an "Inventory Manager" option 254 that may allow system operators to control and view cards, terminals and gateways used in the system. With the inventory manager, a user may add, modify and assign cards, add and/or modify terminals and add and/or modify gateways. Although terminals and gateways are may changed only rarely, cards may be frequently modified in response to changing business needs and customer service. The user interface may also include a product manager option 256 that may be used to add and/or modify products. This includes the ability to set prices and include/exclude vendor offers. In addition, the user interface 252 may include a sales manager option 258 that may be used to control and view the sales channels in the system. The system operator can add and/or modify sales channels and view orders. The user interface 252 may further include a vendor manager option 260 that allows the system operator to control and view the vendors (namely partner attractions and special-offer partners) in the system. The vendor manager may be used to add and retire vendors, to add and/or modify vendor promotions and to view vendor activity. It is of course to be appreciated that the user interface may also include other and different menu options or may label menu options differently than is illustrated in FIG. 11. The important principle of the interface 250 is to provide the system manager operators with a convenient access to the system network to control and modify the system as needed or desired.

Having thus described several aspects of at least one embodiment of this invention, it is to be appreciated various alterations, modifications, and improvements will readily occur to those skilled in the art. For example, although the system has been described primarily in terms of smart card technologies, the system may also operate with another form of user code. For example, instead of smart cards, card-visitors may be provided with a unique PIN or with a card printed with a barcode rather than having any embedded technology. As may also be appreciated based on this disclosure, aspects of the present inventions may be implemented using software stored on a computer readable medium such as a compact disk, hard drive or memory stick or in special purpose hardware. It should also be understood that the functionality of various of the components in the examples described above may be combined or divided in various ways, such as having a card enabled and reward terminal combined into a single unit or dividing the system management functions among multiple computers. Such and other alterations, modifications, and improvements are intended to be part of this disclosure, and are intended to be within the scope of the invention. Accordingly, the foregoing description and drawings are by way of example and explanation only and are not intended to be limiting. The scope of the invention should be determined from proper construction of the appended claims, and their equivalents.

The invention claimed is:

1. A manager system that permits access to a plurality of attractions, the system comprising:

a network interface configured to:

receive data corresponding to actual use of reward terminals to access respective attractions of the plurality of attractions for a time period, the reward terminals being located in proximity to the plurality of attractions, being configured to access the respective attractions using at least one product code, the data identifying at least one attraction; and provide at least one product definition to the reward terminals, the at least one product definition including associations between the at least one product code and the respective attractions, whereby a change in the associations between the at least one product code and the respective attractions changes the access to the respective attractions via the reward terminals using the at least one product code;

a database to store the at least one product definition;

a database to store the data corresponding to the actual use of the reward terminals to access the attractions; and a controller to calculate an aggregated compensation for each attraction based on the actual use of the reward terminals to access the respective attraction by a plurality of users, wherein the controller does not compensate the attractions based on the actual use of the reward terminals at a time of the actual use of the reward terminals via a card.

2. The manager system as claimed in claim 1, wherein the at least one product definition includes a list of the plurality of attractions.

3. The manager system as claimed in claim 1, wherein the network interface is configured to enable periodic data transfer between the database and the reward terminals.

4. The product manager system as claimed in claim 1, wherein the reward terminals include smart card readers.

5. The product manager system as claimed in claim 1, wherein at least one attraction of the plurality of attractions is constrained in time.

6. The product manager system as claimed in claim 1, wherein at least one attraction of the plurality of attractions is constrained in frequency of use.

7. The manager system as claimed in claim 1, wherein the reward terminals enable each of the respective attractions to individually control access to the attraction.

8. An access system for use with user codes comprising:

a controller configured to be coupled to at least one reward terminal and configured to provide information to the at least one reward terminal, receive data of actual use to access a plurality of attractions from the at least one reward terminal once every predetermined time period, and calculate an aggregated compensation for each attraction based on the actual use of the reward terminals to access the respective attraction by a plurality of users, the at least one reward terminal being configured to access rewards using at least one user code, wherein the controller does not compensate the attractions based on the actual use of the reward terminals at a time of the actual use of the reward terminals via a card; and a database, coupled to the controller, that stores the information to be provided to the at least one reward terminal and the data received from the at least one reward terminal;

wherein the information includes an attraction list of attractions accessible from the at least one reward terminal and a product list of attractions that are accessible with each user code, whereby a change in the product list of attractions changes the rewards that are accessible with the at least one user code; and wherein the data includes a list of user codes and attractions, the user codes associated with users who access rewards for the attractions via the reward terminal during the predetermined time period.

9. The system as claimed in claim 8, wherein the database is configured to communicate with the at least one reward terminal with predetermined periodicity to provide the information to the reward terminal and to receive the data from the at least one reward terminal.

10. The system as claimed in claim 9, wherein the predetermined periodicity is once a day.

11. The access system as claimed in claim 8, wherein the user codes are encoded on programmable smart cards.

12. The access system as claimed in claim 8, wherein each attraction included in the attraction list and product list is defined by a unique attraction code.

13. The access system as claimed in claim 12, wherein the unique attraction code includes information defining at least one access restriction for the attraction.

14. The access system as claimed in claim 13, wherein the at least one access restriction includes a predetermined number of times that access to the attraction is valid for each user code.

15. The access system as claimed in claim 13, wherein the at least one access restriction includes a predetermined time period during which access to the attraction is valid.

16. The access system as claimed in claim 15, wherein the predetermined time period begins on a first actual use by a user.

17. The system as claimed in claim 8, wherein the at least one reward terminal being further configured to enable each of the respective attractions to individually control access to the attraction based on the rewards.

18. A computer-implemented method of managing access to at least one tourist attraction, the method comprising:

associating a user code with a product, the product associated with the at least one tourist attraction;

receiving the user code at a reward terminal, the reward terminal being located in proximity to the at least one tourist attraction and being configured to access a reward associated with the at least one tourist attraction using the user code, whereby a change in the product changes the rewards accessible via the reward terminal using the at least one user code;

recording, by the reward terminal, the use of the user code to access the reward associated with the at least one tourist attraction; and transmitting the use of the user code to a controller for calculation of an aggregated compensation for the at least one tourist attraction based on the use of the reward terminals to access the at least one tourist attraction by a plurality of users, wherein the controller does not compensate the attractions based on the actual use of the reward terminals at a time of the actual use of the reward terminals via a card.

19. The method as claimed in claim 18, wherein associating the user code with the product includes associating a user code with a product definition that comprises a list at least one tourist attraction.

20. The method as claimed in claim 18, further comprising periodically exchanging information between the reward terminal and a remote system.

21. The method as claimed in claim 18, wherein receiving the user code at the reward terminal includes receiving the user code at a reward terminal comprising a smart card reader.

22. The method as claimed in claim 18, wherein associating the user code with the product includes associating a user code with a product that comprises at least one tourist attraction that is constrained in time.

23. The method as claimed in claim 18, wherein associating the user code with the product includes associating a user code with a product that comprises at least one tourist attraction that is constrained in frequency of use.

24. The method as claimed in claim 18, wherein the reward terminal being further configured to enable the at least one tourist attraction to individually control access to the respective tourist attraction.

* * * * *